(12) United States Patent
Nadaoka et al.

(10) Patent No.: US 11,565,643 B2
(45) Date of Patent: Jan. 31, 2023

(54) FRONT GUARD AND WORKING VEHICLE

(71) Applicant: KUBOTA CORPORATION, Osaka (JP)

(72) Inventors: Ryuichi Nadaoka, Jefferson, GA (US); Takahiro Yonekura, Jefferson, GA (US); Daniel Underwood, Jefferson, GA (US)

(73) Assignee: KUBOTA CORPORATION, Osaka (JP)

( * ) Notice: Subject to any disclaimer, the term of this patent is extended or adjusted under 35 U.S.C. 154(b) by 110 days.

(21) Appl. No.: 17/156,965

(22) Filed: Jan. 25, 2021

(65) Prior Publication Data

US 2022/0234532 A1 Jul. 28, 2022

(51) Int. Cl.
*B60R 19/52* (2006.01)

(52) U.S. Cl.
CPC ........ *B60R 19/52* (2013.01); *B60R 2019/525* (2013.01)

(58) Field of Classification Search
CPC .................. B60R 19/52; B60R 2019/525
USPC ......................................... 293/115, 145, 118
See application file for complete search history.

(56) References Cited

U.S. PATENT DOCUMENTS

| 2009/0033125 | A1* | 2/2009 | Ayabe | B62D 63/04 |
| | | | | 296/187.09 |
| 2017/0129543 | A1* | 5/2017 | Matsumoto | B60R 19/44 |
| 2021/0009059 | A1* | 1/2021 | Thompson | B60R 19/52 |
| 2022/0153216 | A1* | 5/2022 | Drever | B60R 19/52 |

FOREIGN PATENT DOCUMENTS

JP 2013-18324 A 1/2013

* cited by examiner

*Primary Examiner* — D Glenn Dayoan
*Assistant Examiner* — E Turner Hicks
(74) *Attorney, Agent, or Firm* — Greenblum & Bernstein, P.L.C.

(57) ABSTRACT

A front guard attached to a front portion of a vehicle body of a work vehicle includes a lower frame attached to the vehicle body, and an upper frame that is attached to the lower frame so as to be swingable around a shaft oriented in the vehicle width direction and the posture of which can be changed between a standing posture and a forward leaning posture by swinging with respect to the lower frame. The upper frame has: a left part that is pivotally supported by a left portion of the lower frame and extends upward; a right part that is pivotally supported by a right portion of the lower frame and extends upward; and an upper part that couples an upper portion of the left part and an upper portion of the right part. The upper part is provided with a protruding portion that protrudes downward.

12 Claims, 22 Drawing Sheets

FRONT GUARD AND WORKING VEHICLE

BACKGROUND OF THE INVENTION

Field of the Invention

The present invention relates to a front guard mounted on a work vehicle such as a tractor and a work vehicle provided with the front guard.

Description of the Related Art

Conventionally, the front guard of a work vehicle disclosed in Japanese Unexamined Patent Publication No. 2013-18324 is known. This front guard has a lower frame attached to a vehicle body and an upper frame swingable with respect to the lower frame. The upper frame can be shifted between a guard position where it is erected to protect a hood and a retracted position where it is tilted forward with respect to the lower frame.

BRIEF SUMMARY OF THE INVENTION

Problems to be Solved by the Invention

In a work vehicle such as a tractor provided with the front guard as described above, an operator who drives the work vehicle may make an erroneous operation in which the front guard and a part of the work vehicle come into contact with each other. For example, the hood may be opened while the upper frame is located in the guard position. In addition, the upper frame is set in the retracted position while a front loader mounted on the front portion of the work vehicle is lowered, and the front loader may be raised as it is. In addition, the upper frame is set in the retracted position while the front loader raised, and the front loader may be lowered as it is. However, the above publication does not describe measures against such erroneous operations.

In view of such circumstances, an object of the present invention is to provide: a front guard that can be prevented from being damaged even if an operator makes an erroneous operation in which a front guard comes into contact with a part of a work vehicle; and a work vehicle provided with the front guard.

Means of Solving the Problems

The present invention adopts the following technical means in order to achieve the above object.

A front guard of a work vehicle according to one aspect of the present invention is attached to a front portion of a vehicle body of a work vehicle. The front guard includes a lower frame attached to the vehicle body, and an upper frame that is attached to the lower frame so as to be swingable around a shaft oriented in a vehicle width direction and a posture of which can be changed between a standing posture and a forward leaning posture by swinging with respect to the lower frame. The upper frame has: a left part that is pivotably supported by a left portion of the lower frame and extends upward; a right part that is pivotally supported by a right portion of the lower frame and extends upward; and an upper part that couples an upper portion of the left part and an upper portion of the right part. The upper part is provided with a protruding portion that protrudes downward.

Preferably, a lower portion of the left part and a lower portion of the right part are each formed with a lower curved portion that is curved backward as it goes downward.

Preferably, the upper portion of the left part and the upper portion of the right part are each formed with an upper curved portion that is curved backward as it goes upward.

Preferably, an elastic member is provided on a back surface of the protruding portion.

A work vehicle according to one aspect of the present invention includes a vehicle body, a hood that can be opened and closed with a front portion of the vehicle body as a fulcrum, and a front guard attached to the vehicle body in front of the hood. The front guard has a lower frame attached to the vehicle body, and an upper frame that is attached to the lower frame so as to be swingable around a shaft oriented in a vehicle width direction and a posture of which can be changed between a standing posture and a forward leaning posture by swinging with respect to the lower frame. The upper frame has: a left part that is pivotally supported by a left portion of the lower frame and extends upward; a right part that is pivotally supported by a right portion of the lower frame and extends upward; and an upper part that couples an upper portion of the left part and an upper portion of the right part. The upper part is provided with a protruding portion that protrudes downward. The protruding portion is located in a position where the protruding portion comes into contact with an upper surface of the hood when the hood is opened while the upper frame is located in the standing posture.

Preferably, when the hood is opened while the front guard is located in the standing posture, the hood comes into contact with the protruding portion and the upper frame swings from the standing posture toward the forward leaning posture.

A work vehicle according to one aspect of the present invention includes a vehicle body, a front guard attached to a front portion of the vehicle body, and a front loader that is attached to the front portion of the vehicle body and can be raised and lowered. The front guard has a lower frame attached to the vehicle body, and an upper frame that is attached to the lower frame so as to be swingable around a shaft oriented in a vehicle width direction and a posture of which can be changed between a standing posture and a forward leaning posture by swinging with respect to the lower frame. The upper frame has a vertical part that extends upward, and an upper portion of the vertical part is formed with an upper curved portion that is curved backward as it goes upward. The upper curved portion has a first upper region that is located on a movement trajectory of a part of the front loader when the front loader is lowered while the upper frame is located in the forward leaning posture, and a second upper region that is curved forward as it goes downward from the first upper region.

Preferably, the front loader has a stand that can be grounded when the front loader is lowered, and the first upper region is located on the movement trajectory of a part of the stand when the front loader is lowered while the upper frame is located in the forward leaning posture.

Preferably, the stand has a left leg portion, a right leg portion, and a coupling portion that couples the left leg portion and the right leg portion. The first upper region is located on a movement trajectory of the coupling portion when the front loader is lowered while the upper frame is located in the forward leaning posture.

Preferably, the upper frame has a left part that is pivotally supported by a left portion of the lower frame and extends upward, and a right part that is pivotally supported by a right portion of the lower frame and extends upward. The vertical part includes the left part and the right part, and an upper portion of the left part and an upper portion of the right part are each formed with the upper curved portion.

Preferably, when the front loader is lowered while the upper frame is located in the forward leaning posture, a part of the front loader moves downward from the first upper region along the second upper region, and the upper frame swings from the forward leaning posture toward the standing posture.

Preferably, a lower portion of the vertical part is formed with a lower curved portion that is curved backward as it goes downward. The lower curved portion has a first lower region that is located on a movement trajectory of a part of the front loader when the front loader is raised while the upper frame is located in the forward leaning posture, and a second lower region that is curved forward as it goes upward from the first lower region.

Preferably, when the front loader is raised while the upper frame is located in the forward leaning posture, a part of the front loader moves upward from the first lower region along the second lower region, and the upper frame swings from the forward leaning posture toward the standing posture.

Preferably, the protruding portion is provided with an elastic member, and the elastic member is located in a position where the elastic member comes into contact with an upper surface of the hood when the hood is opened while the upper frame is located in the standing posture.

Effects of the Invention

According to the above front guard, the front guard can be prevented from being damaged even if an operator makes an erroneous operation in which the front guard and a part of a work vehicle come into contact with each other.

DETAILED DESCRIPTION OF THE INVENTION

With reference to drawings, embodiments of the present invention will be described below.

<Work Vehicle>

Figure 21:
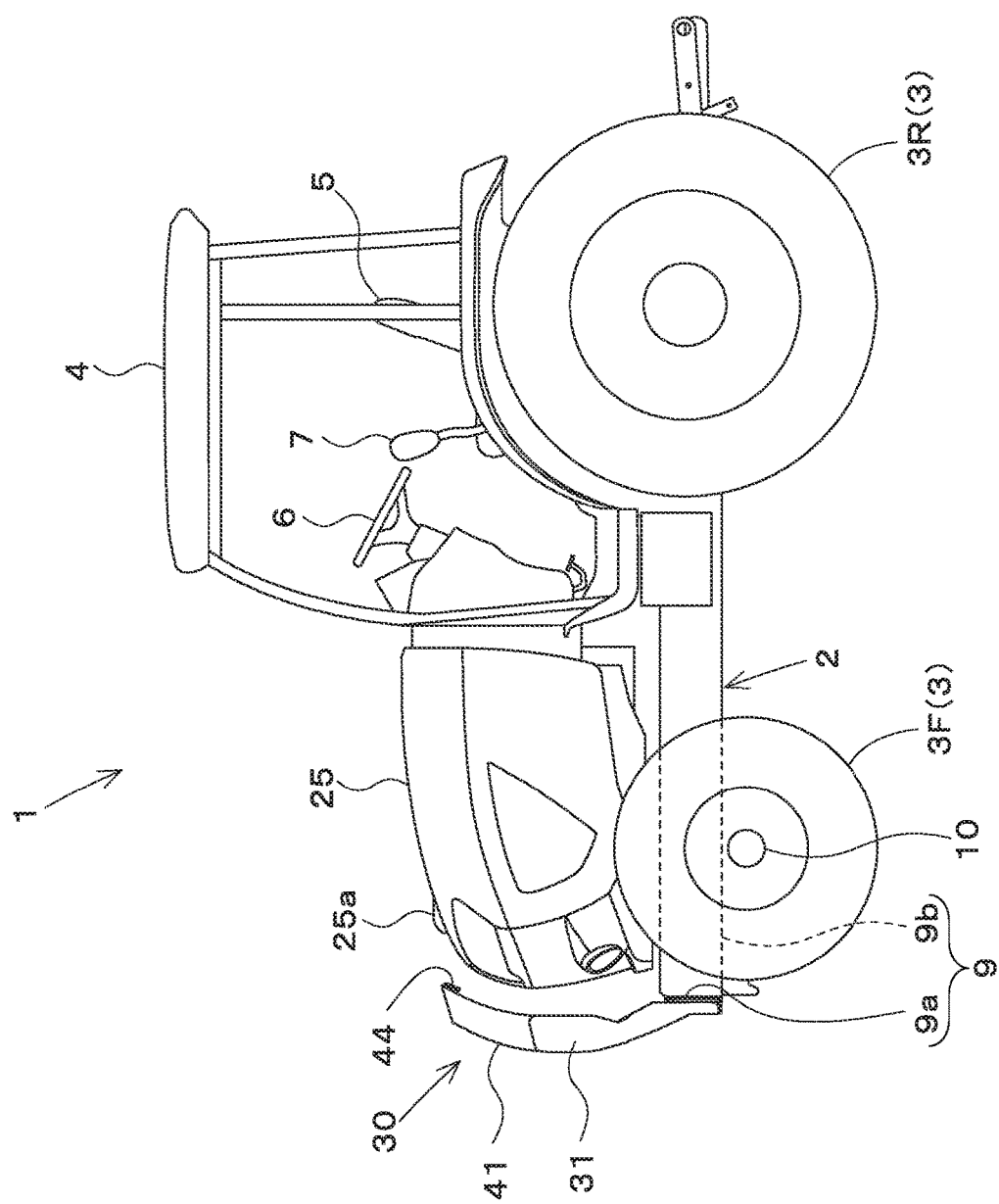
FIG. 21 is a side view of a work vehicle on which the front guard is mounted.

First, a work vehicle 1 on which a front guard according to the present invention is mounted will be described. FIG. 21 is a side view showing one embodiment of the work vehicle 1. In the present embodiment, the work vehicle 1 is a tractor. However, the work vehicle 1 according to the present invention is not limited to a tractor, and may be a work vehicle of other types.

Hereinafter, description will be made assuming that: the front side (left side in FIG. 21) of an operator seating on an operator seat 5 of the work vehicle 1 is front; the back side (right side in FIG. 21) of the operator is back; the left side (front side of the paper surface of FIG. 21) of the operator is left; and the right side (back side of the paper surface of FIG. 21) of the operator is right. In addition, description will be made assuming that a horizontal direction orthogonal to the front-back direction of the work vehicle 1 is a vehicle width direction. In addition, description will be made assuming that: a direction, which is the vehicle width direction and is away from the center of the vehicle width direction, is a vehicle outward direction; and a direction, which is the vehicle width direction and approaches the center of the vehicle width direction, is a vehicle inward direction.

As shown in FIG. 21, the work vehicle 1 includes a vehicle body 2 and a traveling device 3.

A cabin 4 is mounted on the vehicle body 2. An operator seat 5 is provided inside the cabin 4. A steering wheel 6 is arranged in front of the operator seat 5. An operation lever 7 is arranged on the side of the operator seat 5. The traveling device 3 has front wheels 3F provided in the front portion of the vehicle body 2, and rear wheels 3R provided in the back portion of the vehicle body 2.

An engine (not shown) is mounted on the front portion of the vehicle body 2, the upper portion and side portion of which are covered with a hood 25. The hood 25 can be opened and closed with the front portion of the vehicle body 2 as a fulcrum. A raised portion 25a is provided on the upper surface of the hood 25. The raised portion 25a is provided in the center, in the vehicle width direction, of the hood 25. A clutch housing, a transmission case, and the like are provided in the back portion of the vehicle body 2.

The vehicle body 2 has a front axle frame 9 fixed to the underside of the engine. The front axle frame 9 has a front plate member 9a and side plate members 9b. The front plate member 9a is arranged in the front lower portion of the vehicle body 2 and extends in the vehicle width direction. Each of the side plate members 9b is arranged on each of the left side and right side of the vehicle body 2 and extends in the front-back direction. The front end of the side plate member 9*b* on the left side and the front end of the side plate member 9*b* on the right side are coupled by the front plate member 9*a*. The front axle frame 9 supports a front axle case 10. The front axle case 10 supports the axle of the front wheels 3F.

As shown in FIG. 21, a front guard 30 is attached to the front portion of the vehicle body 2. The front guard 30 is attached to the front axle frame 9. The configuration of the front guard 30 will be described later.

Figure 22:
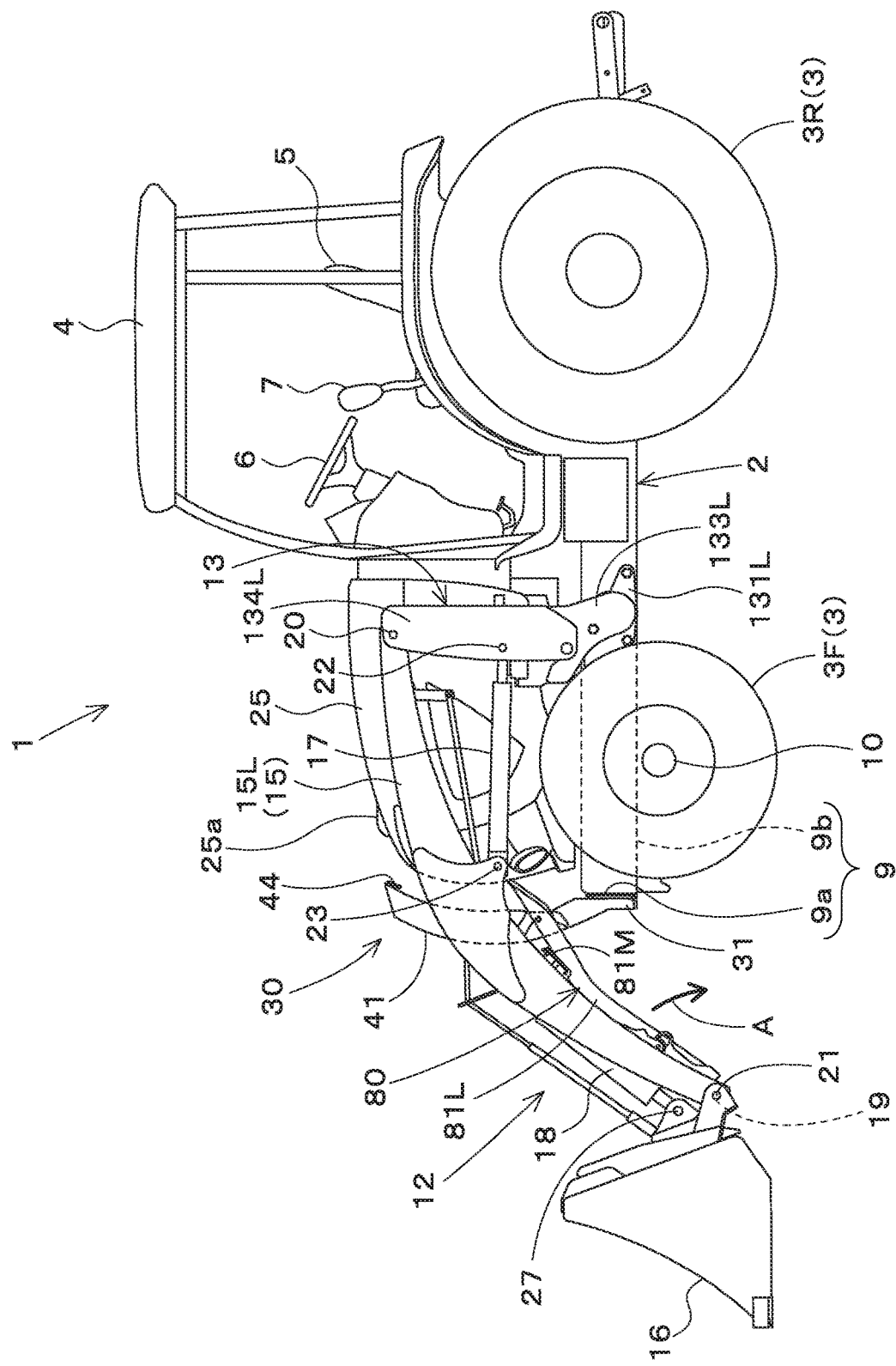
FIG. 22 is a side view of a work vehicle on which the front guard and a front loader are mounted.

FIG. 22 is a side view showing a state where a front loader 12 is attached to the front portion of the vehicle body 2 of the work vehicle 1 shown in FIG. 21. That is, in the work vehicle 1 shown in FIG. 22, the front loader 12 and the front guard 30 are attached to the front portion of the vehicle body 2.

Figure 19:
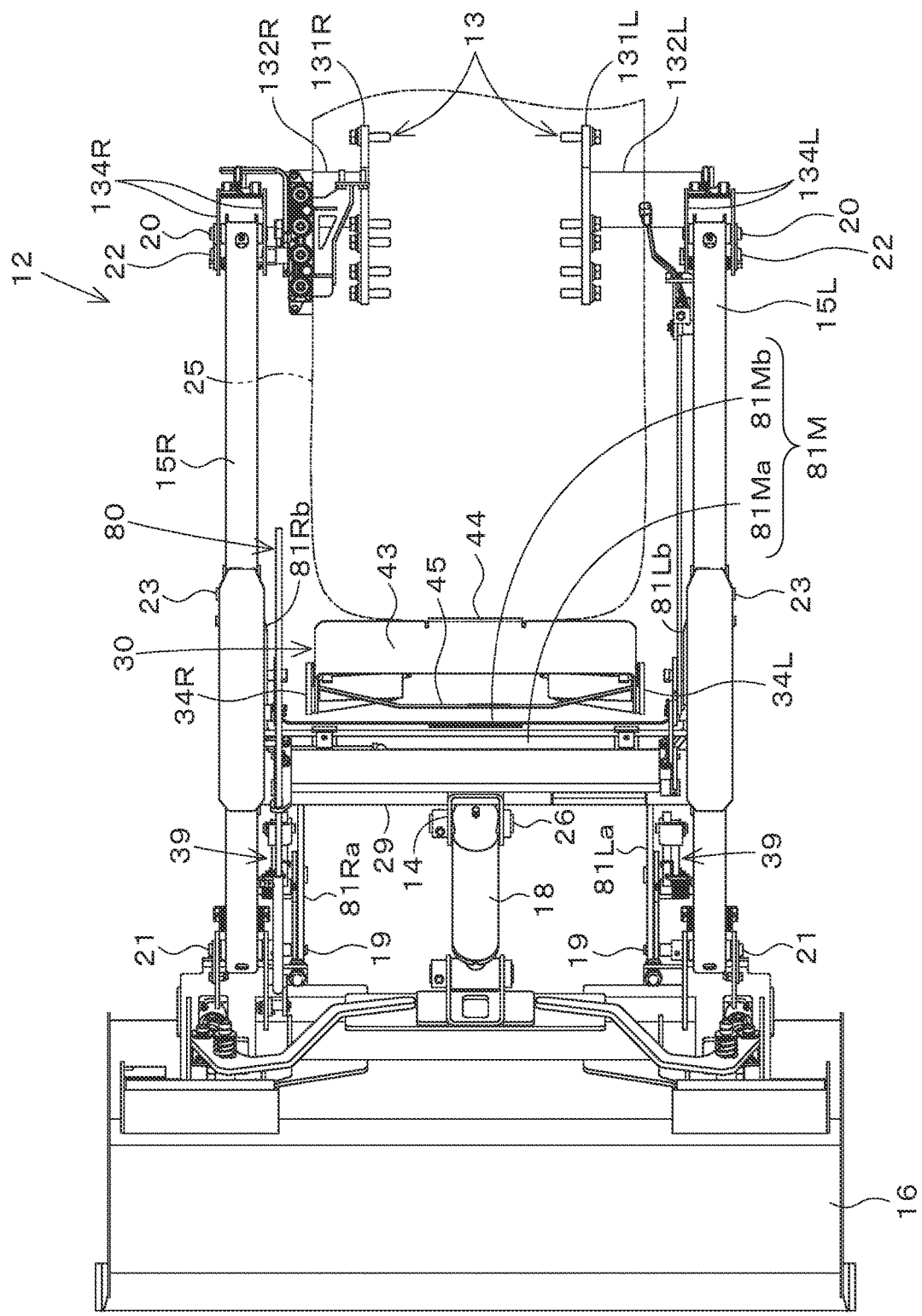
FIG. 19 is a plan view showing the positional relationship between the front guard and the front loader.
Figure 20:
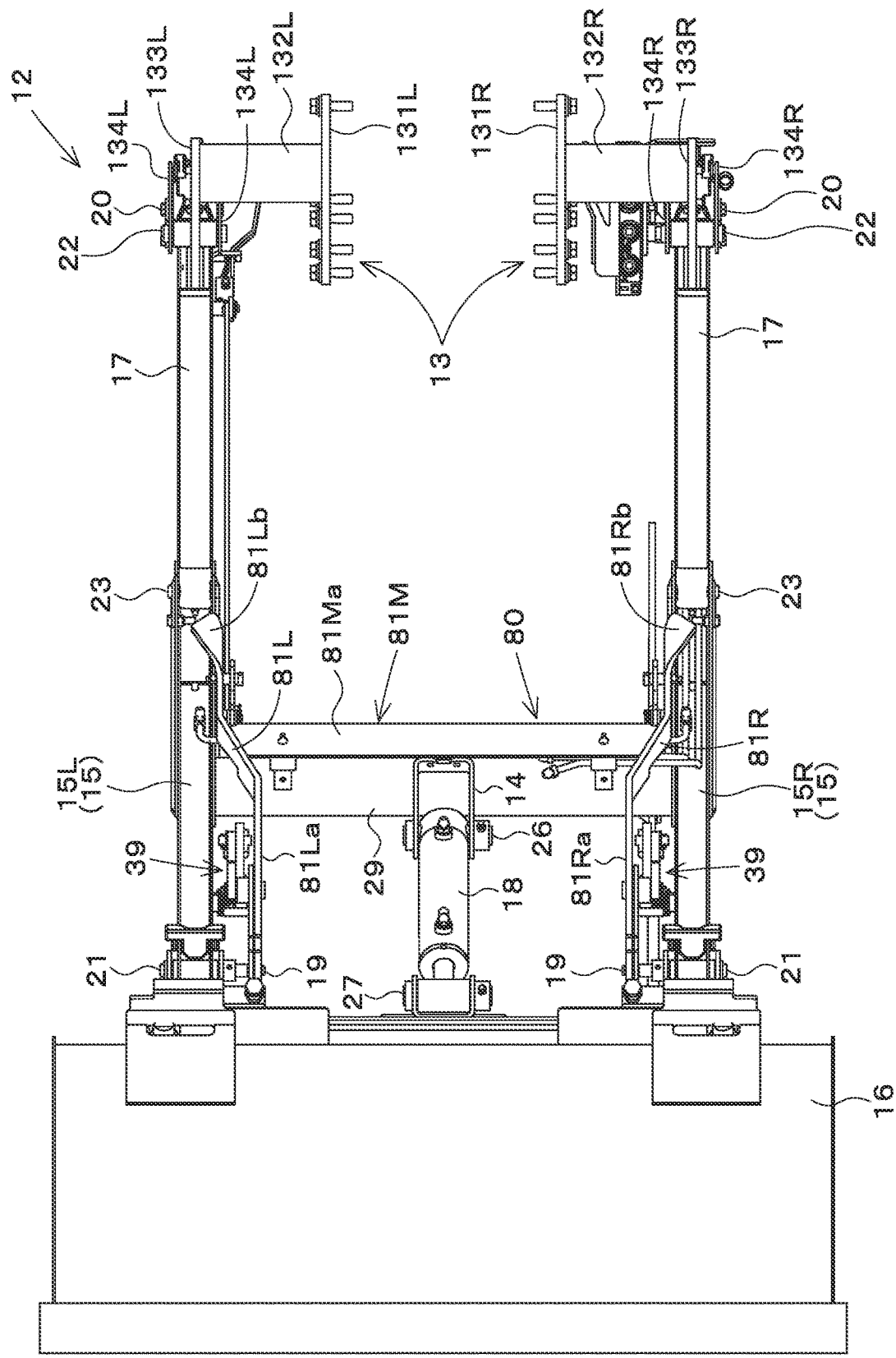
FIG. 20 is a bottom view of the front loader.

FIG. 19 is a plan view showing the front loader 12 together with the front guard 30, and FIG. 20 is a bottom view of the front loader 12.

The front loader 12 includes an attachment body 13, a boom 15, a bucket 16, boom cylinders 17, and bucket cylinders 18.

The attachment body 13 has first attachment members 131L, 131R, second attachment members 132L, 132R, third attachment members 133L, 133R, and fourth attachment members 134L, 134R.

The first attachment members 131L, 131R are plate-shaped members and are attached to the side portion of the vehicle body 2. In detail, the first attachment member 131L is attached to the side plate member 9*b* on the left side. The first attachment member 131R is attached to the side plate member 9*b* on the right side.

The second attachment members 132L, 132R are cylindrical members, and are attached to the first attachment members 131L, 131R, respectively, so as to extend in the vehicle width direction. The second attachment member 132L is attached at one end (left end) thereof to the first attachment member 131L, and extends from the first attachment member 131L toward the vehicle inward side (rightward). The second attachment member 132R is attached at one end (right end) thereof to the first attachment member 131R, and extends from the first attachment member 131R toward the vehicle inward side (leftward).

The third attachment members 133L, 133R are plate-shaped members, and are attached to the second attachment members 132L, 132R. The third attachment member 133L is attached to the other end (right end) of the second attachment member 132L. The third attachment member 133R is attached to the other end (left end) of the second attachment member 132R.

The fourth attachment members 134L, 134R are attached to the third attachment members 133L, 133R, respectively. The fourth attachment member 134L is attached to the third attachment member 133L and extends upward. The fourth attachment member 134R is attached to the third attachment member 133R and extends upward. A pivot shaft 20 that extends in the vehicle width direction is provided on an upper portion of each of the fourth attachment members 134L, 134R.

The boom 15 includes a left boom 15L and a right boom 15R. The left boom 15L is supported by the fourth attachment member 134L. The right boom 15R is supported by the fourth attachment member 134R. The intermediate portion of the left boom 15L and the intermediate portion of the right boom 15R are coupled to each other by a coupling body 29. The base end sides of the boom 15 are swingably supported around the pivot shafts 20 provided in the fourth attachment members 134L, 134R. Pivot shafts 21 that extend in the vehicle width direction are provided on the tip sides of the boom 15.

Each of the boom cylinders 17 couples each of the fourth attachment members 134L, 134R and the boom 15. One end (tip) of the boom cylinder 17 is rotatably and pivotably supported by the intermediate portion, in the up-down direction, of each of the fourth attachment members 134L, 134R via a first horizontal shaft 22. The other end (base end) of the boom cylinder 17 is rotatably and pivotably supported by the intermediate portion, in the front-back direction (longitudinal direction), of the boom 15 via a second horizontal shaft 23. The boom 15 swings upward around the pivot shafts 20 when the boom cylinders 17 extend, and the boom 15 swings downward around the pivot shafts 20 when the boom cylinders 17 contract. Therefore, the front loader 12 can be raised or lowered when the boom cylinders 17 extend or contract.

The bucket 16 is swingably supported around the pivot shafts 21. Each of the bucket cylinders 18 couples the bucket 16 and the booms 15. One end (base end) of the bucket cylinder 18 is rotatably and pivotally supported by a fixture 14 attached to the coupling body 29 via a third horizontal shaft 26. The other end (tip) of the bucket cylinder 18 is, via a fourth horizontal shaft 27 or the like, rotatably and pivotally supported by the bucket 16 via a link mechanism. The bucket cylinders 18 operate the bucket 16. The bucket 16 performs a digging motion around the pivot shafts 21 when the bucket cylinders 18 contract, and the bucket 16 performs a dumping motion around the pivot shafts 21 when the bucket cylinders 18 extend.

As shown in FIGS. 19, 20, and 22, the boom 15 is provided with a stand 80. The stand 80 can be grounded when the front loader 12 is lowered. The stand 80 can be rotated upward or downward with support shafts 19 provided in the front portion of the boom 15 as a fulcrum. When the front loader 12 is lowered, the stand 80 can be grounded by being rotated downward with the support shafts 19 as a fulcrum (see arrow A in FIG. 22). The stand 80 can support the front loader 12 on the ground by being grounded when the front loader 12 is lowered.

As shown in FIG. 22, the stand 80 can be fixed in a position (storage position) where it is rotated upward with the support shafts 19 as a fulcrum. When in the storage position, the stand 80 extends in the front-back direction so as to roughly follow the boom 15.

As shown in FIG. 20 and the like, the stand 80 has a left leg portion 81L, a right leg portion 81R, and a coupling portion 81M. The left leg portion 81L and the right leg portion 81R are attached to the boom 15 via the support shafts 19 and coupling members 39. The left leg portion 81L is attached to the left boom 15L. The right leg portion 81R is attached to the right boom 15R. Hereinafter, the left leg portion 81L and the right leg portion 81R may be collectively referred to as a leg portion 81.

Figure 16:
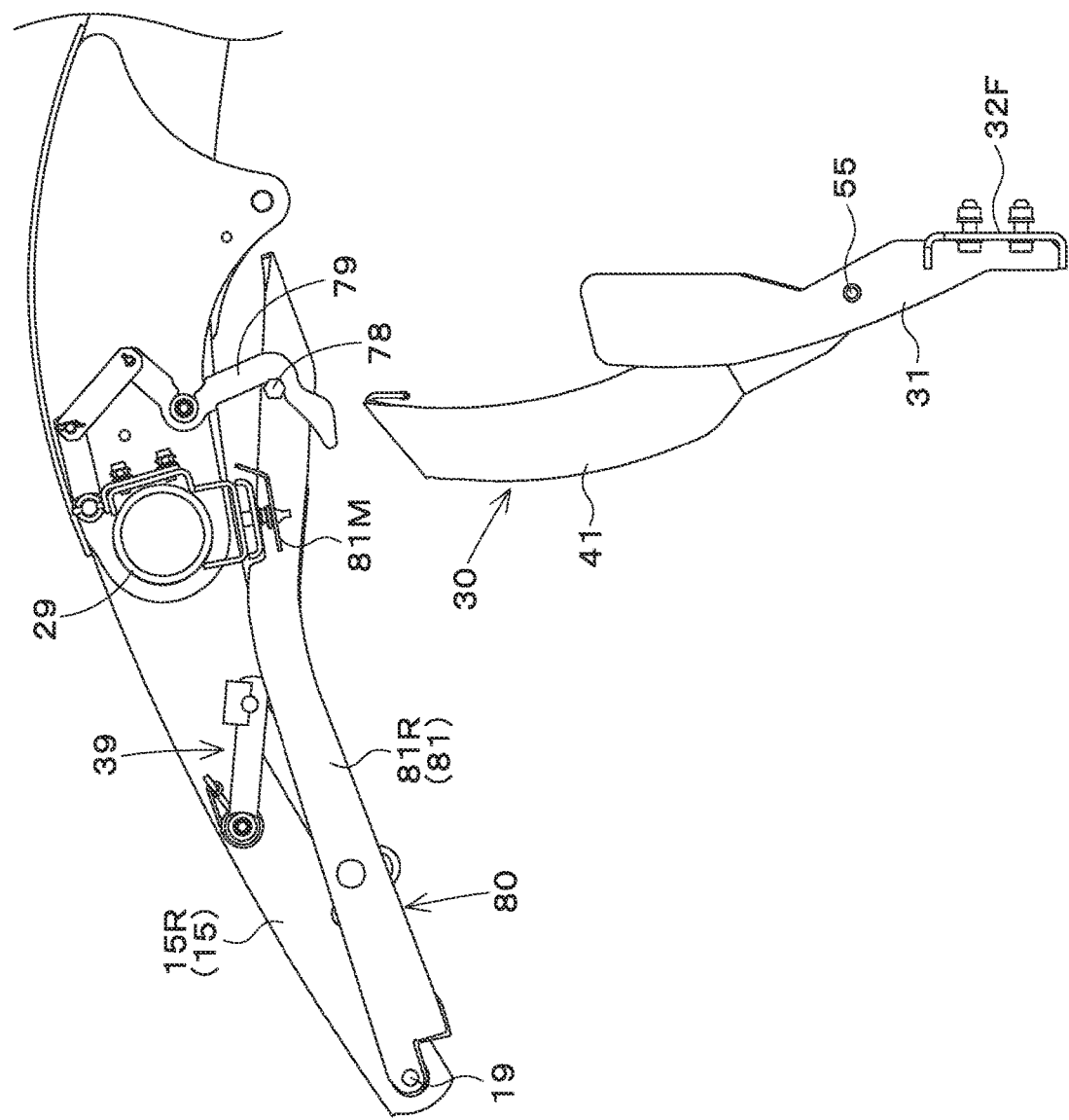
FIG. 16 is a view showing a state where the front loader is raised while the upper frame is located in the retracted position (forward leaning posture).

As shown in FIG. 16, a pin 78 is fixed to the back portion of the leg portion 81 of the stand 80. A hook member 79 capable of locking the pin 78 is attached to the boom 15. As shown in FIG. 16, the stand 80 can be held in the storage position by locking the pin 78 to the hook member 79. In addition, the stand 80 can be rotated downward with the support shaft 19 as a fulcrum by removing the pin 78 from the hook member 79.

As shown in FIG. 22, when the stand 80 is located in the storage position, the left leg portion 81L extends in the front-back direction below the left boom 15L, and the right leg portion 81R extends in the front-back direction below the right boom 15R. As shown in FIGS. 19 and 20, the space between a back portion 81Lb of the left leg portion 81L and a back portion 81Rb of the right leg portion 81R is larger than the space between a front portion 81La of the left leg portion 81L and a front portion 81Ra of the right leg portion 81R.

Figure 13:
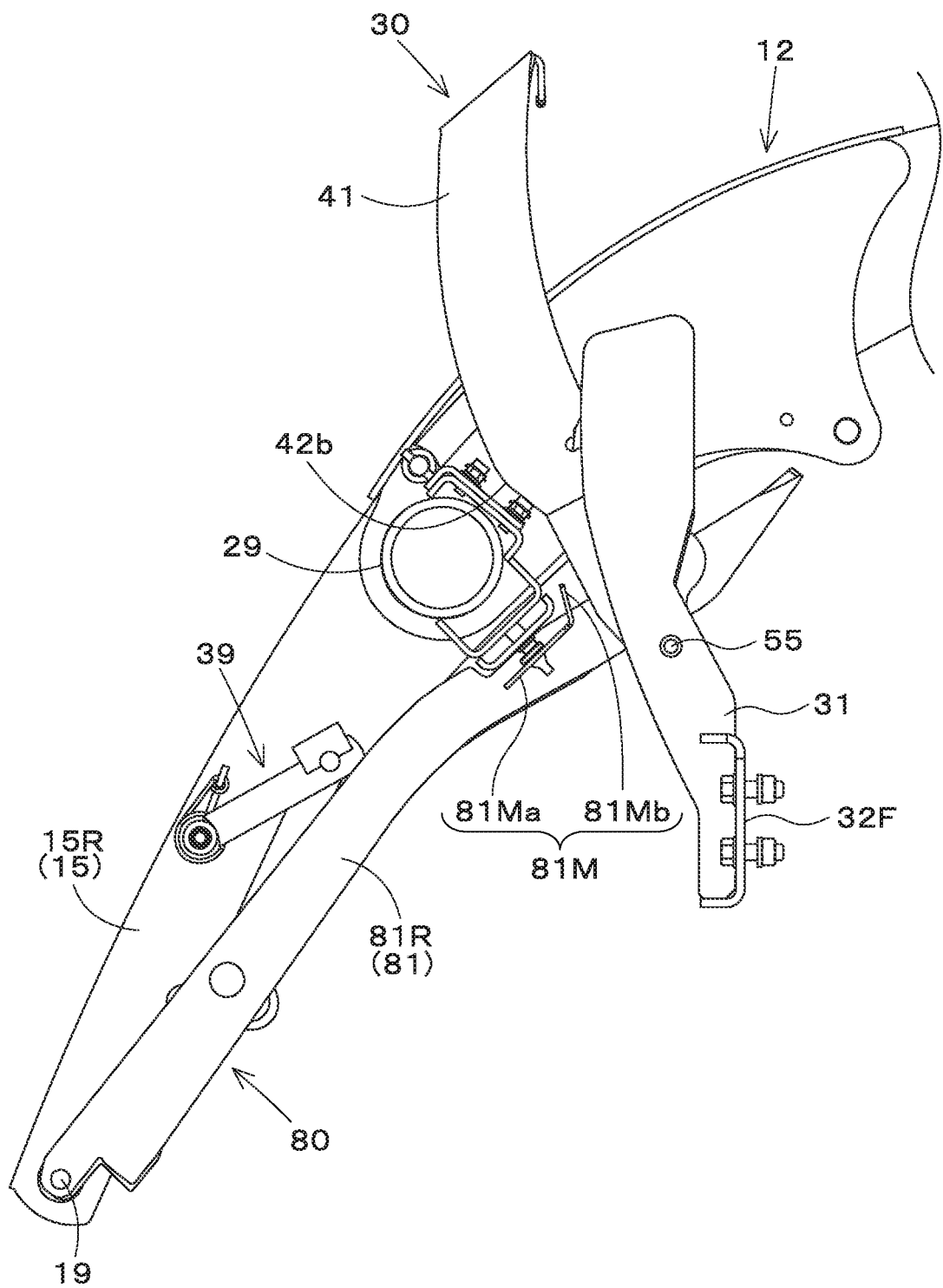
FIG. 13 is a view showing a state where a front loader is lowered while the upper frame is located in the retracted position (forward leaning posture).

As shown in FIG. 20, the coupling portion 81M couples the left leg portion 81L and the right leg portion 81R. The coupling portion 81M extends in the vehicle width direction. As shown in FIGS. 13 and 19, the coupling portion 81M has a lower part 81Ma and a back part 81Mb. The lower part 81Ma is connected at the left end thereof to the left leg portion 81L, and is connected at the right end thereof to the right leg portion 81R. The back part 81Mb bends from the back end of the lower part 81Ma and extends upward and backward. As shown in FIG. 13, when the stand 80 is located in the storage position while the front loader 12 is lowered, the back part 81Mb is tilted forward as it goes upward.

FIG. 19 is a plan view showing the positional relationship between the front guard 30 and the front loader 12 while the front loader 12 is lowered. In FIG. 19, the front guard 30 is located in the guard position (standing posture) described later, and the stand 80 is located in the storage position.

As shown in FIG. 19, the front guard 30 is located between the left boom 15L and the right boom 15R of the front loader 12. In addition, the front guard 30 is located between the left leg portion 81L and right leg portion 81R of the stand 80 (between the back portion 81Lb and the back portion 81Rb). In addition, the front guard 30 is located behind the coupling portion 81M.

As shown in FIG. 19, the front guard 30 is located between the left boom 15L and the right boom 15R of the front loader 12. In addition, the front guard 30 is located between the left leg portion 81L and right leg portion 81R of the stand 80 (between the back portion 81Lb and the back portion 81Rb). In addition, the front guard 30 is located behind the coupling portion 81M.

<Front Guard>

Next, the front guard 30 mounted on the work vehicle 1 will be described.

As shown in FIGS. 21 and 22, the front guard 30 is attached to the front portion of the vehicle body 2 of the work vehicle 1. The front guard 30 is arranged in front of the hood 25 of the work vehicle 1 in order to protect the front portion of the hood 25.

As shown in FIGS. 1 to 4, the front guard 30 includes a lower frame 31 and an upper frame 41. The lower frame 31 is attached to the vehicle body 2 of the work vehicle 1. The upper frame 41 is attached to the lower frame 31. As shown in FIG. 5, the posture of the upper frame 41 can be changed between a standing posture (see the solid line) and a forward leaning posture (see the virtual line) by swinging with respect to the lower frame 31.

In the following description, the description of the directions relating to the front guard 30 and of the positional relationships among the components of the front guard 30 will be made based on a state where the front guard 30 is attached to the vehicle body 2 and the upper frame 41 is located in the standing posture (state shown in FIGS. 21 and 22).

First, the lower frame 31 will be described with reference to FIGS. 1 to 4. The lower frame 31 has a symmetrical shape (left-right symmetry) with respect to the center line in the vehicle width direction.

The lower frame 31 has a left lower member 32L, a right lower member 32R, and a front lower member 32F.

The left lower member 32L is arranged on the left side in front of the vehicle body 2. The right lower member 32R is arranged on the right side in front of the vehicle body 2. The left lower member 32L is arranged such that one surface (surface on the vehicle outward side) faces leftward and the other surface (surface on the vehicle inward side) faces rightward. The right lower member 32R is arranged such that one surface (surface on the vehicle outward side) faces rightward and the other surface (surface on the vehicle inward side) faces leftward.

The front lower member 32F couples the lower portion of the left lower member 32L and the lower portion of the right lower member 32R. The front lower member 32F is attached to the front plate member 9a of the front axle frame 9. Specifically, the front lower member 32F is attached to the front portion of the front plate member 9a by bolts BL1.

The left lower member 32L has a left base portion 33L and a left extending portion 34L.

The left base portion 33L is located at the lower portion of the left lower member 32L. The left base portion 33L is connected to the left portion of the front lower member 32F, and extends upward from the same left portion. The left base portion 33L is tilted forward as it goes upward. A left pivot shaft 55L is inserted through the left base portion 33L. The left pivot shaft 55L extends in the vehicle width direction. The left pivot shaft 55L is also inserted through a left part 42L of the upper frame 41, which will be described later.

The left extending portion 34L has a left lower extending portion 34La and a left upper extending portion 34Lb. The left lower extending portion 34La extends diagonally to the upper left from the front portion of the left base portion 33L. The left upper extending portion 34Lb extends upward from the upper end of the left lower extending portion 34La.

The right lower member 32R has a right base portion 33R and a right extending portion 34R.

The right base portion 33R is located at the lower portion of the right lower member 32R. The right base portion 33R is connected to the right portion of the front lower member 32F, and extends upward from the same right portion. The right base portion 33R is tilted forward as it goes upward. A right pivot shaft 55R is inserted through the right base portion 33R. The right pivot shaft 55R extends in the vehicle width direction. The right pivot shaft 55R is also inserted through a right part 42R of the upper frame 41, which will be described later.

The right extending portion 34R has a right lower extending portion 34Ra and a right upper extending portion 34Rb. The right lower extending portion 34Ra extends diagonally to the upper right from the front portion of the right base portion 33R. The right upper extending portion 34Rb extends upward from the upper end of the right lower extending portion 34Ra.

Hereinafter, the left extending portion 34L and the right extending portion 34R may be collectively referred to as an extending portion 34. In addition, the left pivot shaft 55L and the right pivot shaft 55R may be collectively referred to as a pivot shaft 55.

Figure 1:
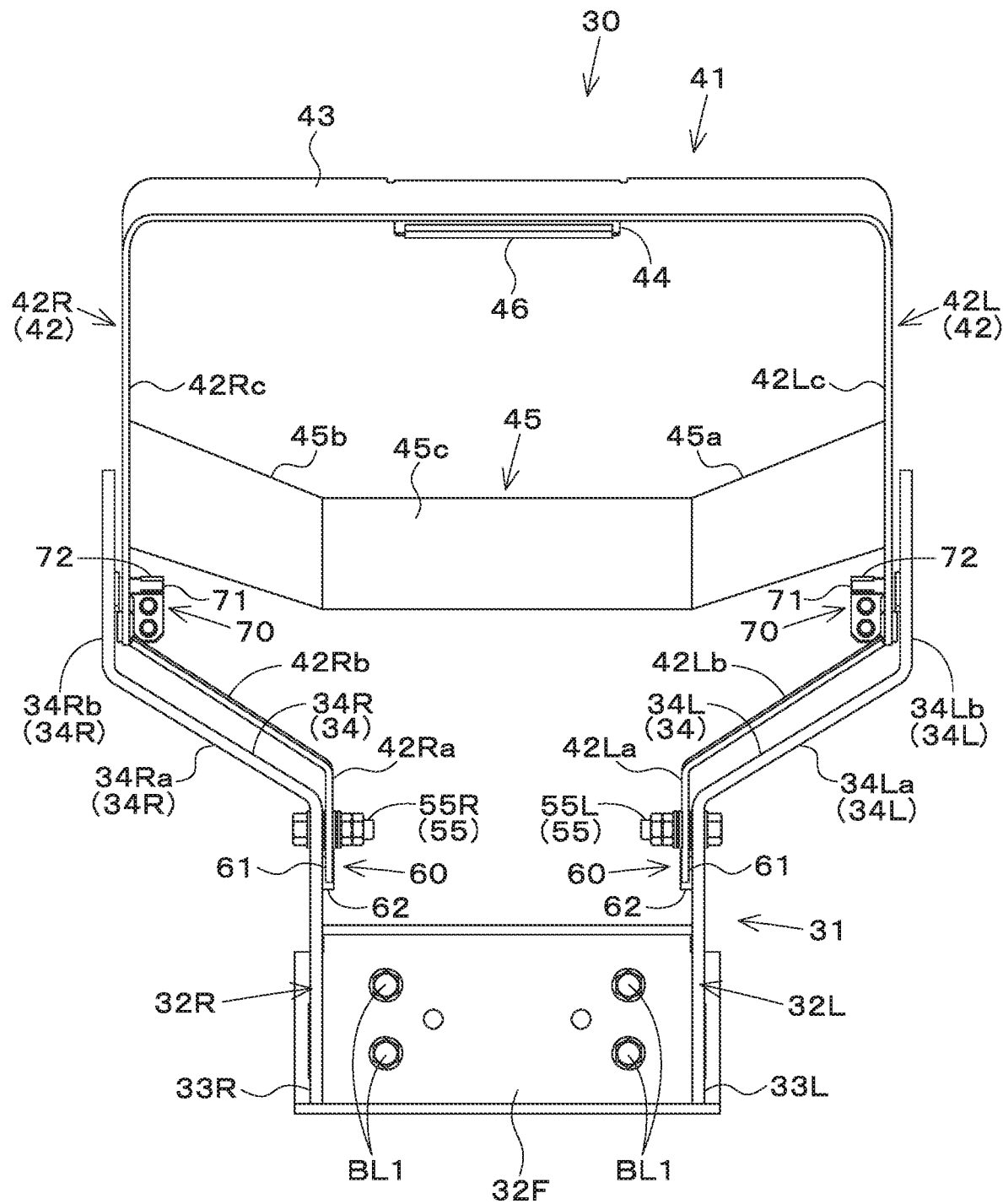
FIG. 1 is a front view of a front guard.

As shown in FIG. 1, the left base portion 33L and the right base portion 33R are arranged parallel to each other. In addition, the left upper extending portion 34Lb and the right upper extending portion 34Rb are also arranged in parallel to each other. The space between the left upper extending portion 34Lb and the right upper extending portion 34Rb is larger than the space between the left base portion 33L and the right base portion 33R. The space between the upper end of the left lower extending portion 34La and the upper end of the right lower extending portion 34Ra is larger than the space between the lower end of the left lower extending portion 34La and the lower end of the right lower extending portion 34Ra. The space between the left lower extending portion 34La and the right lower extending portion 34Ra gradually increases as it goes upward from downward.

The upper frame 41 is attached to the lower frame 31 so as to be swingable around the shaft oriented in the vehicle width direction. Specifically, the upper frame 41 is attached to the lower frame 31 so as to be swingable around the left pivot shaft 55L and the right pivot shaft 55R. That is, the pivot shaft 55 (left pivot shaft 55L, right pivot shaft 55R) supports the upper frame 41 so as to be swingable with respect to the lower frame 31.

Next, the upper frame 41 will be described. The upper frame 41 has a symmetrical shape (left-right symmetry) with respect to the center line in the vehicle width direction.

The upper frame 41 has a vertical part 42 that extends upward. The vertical part 42 includes the left part 42L and the right part 42R. The upper portion of the left part 42L and the upper portion of the right part 42R are coupled by an upper part 43. The left part 42L, the right part 42R, and the upper part 43 are integrally formed from one member. Specifically, the left part 42L, the right part 42R, and the upper part 43 are formed by bending one plate member.

The left part 42L is pivotally supported by the left portion (left lower member 32L) of the lower frame 31 and extends upward. The left part 42L is arranged on the vehicle inward side (right side) of the left lower member 32L. The right part 42R is pivotally supported by the right portion (right lower member 32R) of the lower frame 31 and extends upward. The right part 42R is arranged on the vehicle inward side (left side) of the right lower member 32R.

The left part 42L has a left lower part 42La, a left middle part 42Lb, and a left upper part 42Lc. The left lower part 42La is attached to the left lower member 32L and extends upward. The left middle part 42Lb is tilted and extends to the vehicle outward side (left side) as it goes upward from the upper end of the left lower part 42La. The left upper part 42Lc extends upward from the upper end of the left middle part 42Lb to the upper part 43.

The right part 42R has a right lower part 42Ra, a right middle part 42Rb, and a right upper part 42Rc. The right lower part 42Ra is attached to the right lower member 32R and extends upward. The right middle part 42Rb is tilted and extends to the vehicle outward side (right side) as it goes upward from the upper end of the right lower part 42Ra. The right upper part 42Rc extends upward from the upper end of the right middle part 42Rb to the upper part 43.

As shown in FIG. 1, the left lower part 42La and the right lower part 42Ra are arranged parallel to each other. In addition, the left upper part 42Lc and the right upper part 42Rc are also arranged parallel to each other. The space between the left upper part 42Lc and the right upper part 42Rc is larger than the space between the left lower part 42La and the right lower part 42Ra. The space between the upper end of the left middle part 42Lb and the upper end of the right middle part 42Rb is larger than the space between the lower end of the left middle part 42Lb and the lower end of the right middle part 42Rb. The space between the left middle part 42Lb and the right middle part 42Rb gradually increases as it goes upward from downward.

The left part 42L is attached to the left lower member 32L so as to be swingable around the shaft oriented in the vehicle width direction. Specifically, the left lower part 42La of the left part 42L is attached to the left lower member 32L so as to be swingable around the left pivot shaft 55L. The left pivot shaft 55L is inserted through the left lower part 42La and the left base portion 33L.

The right part 42R is attached to the right lower member 32R so as to be swingable around the shaft oriented in the vehicle width direction. Specifically, the right lower part 42Ra of the right part 42R is attached to the right lower member 32R so as to be swingable around the right pivot shaft 55R. The right pivot shaft 55R is inserted through the right lower part 42Ra and the right base portion 33R.

By swinging the left part 42L with respect to the left lower member 32L around the left pivot shaft 55L and the right part 42R with respect to the right lower member 32R around the right pivot shaft 55R, the upper frame 41 swings with respect to the lower frame 31. By the upper frame 41 swinging with respect to the lower frame 31, the posture of the upper frame 41 can be changed between a standing posture (see the solid line) and a forward leaning posture (see the virtual line) (see FIG. 5). When the upper frame 41 is located in the standing posture, the upper frame 41 is located in a position (guard position P1) close to the front surface of the hood 25. When the upper frame 41 is located in the forward leaning posture, the upper frame 41 is located in a position (retracted position P2) forward away from the front surface of the hood 25.

Figure 10:
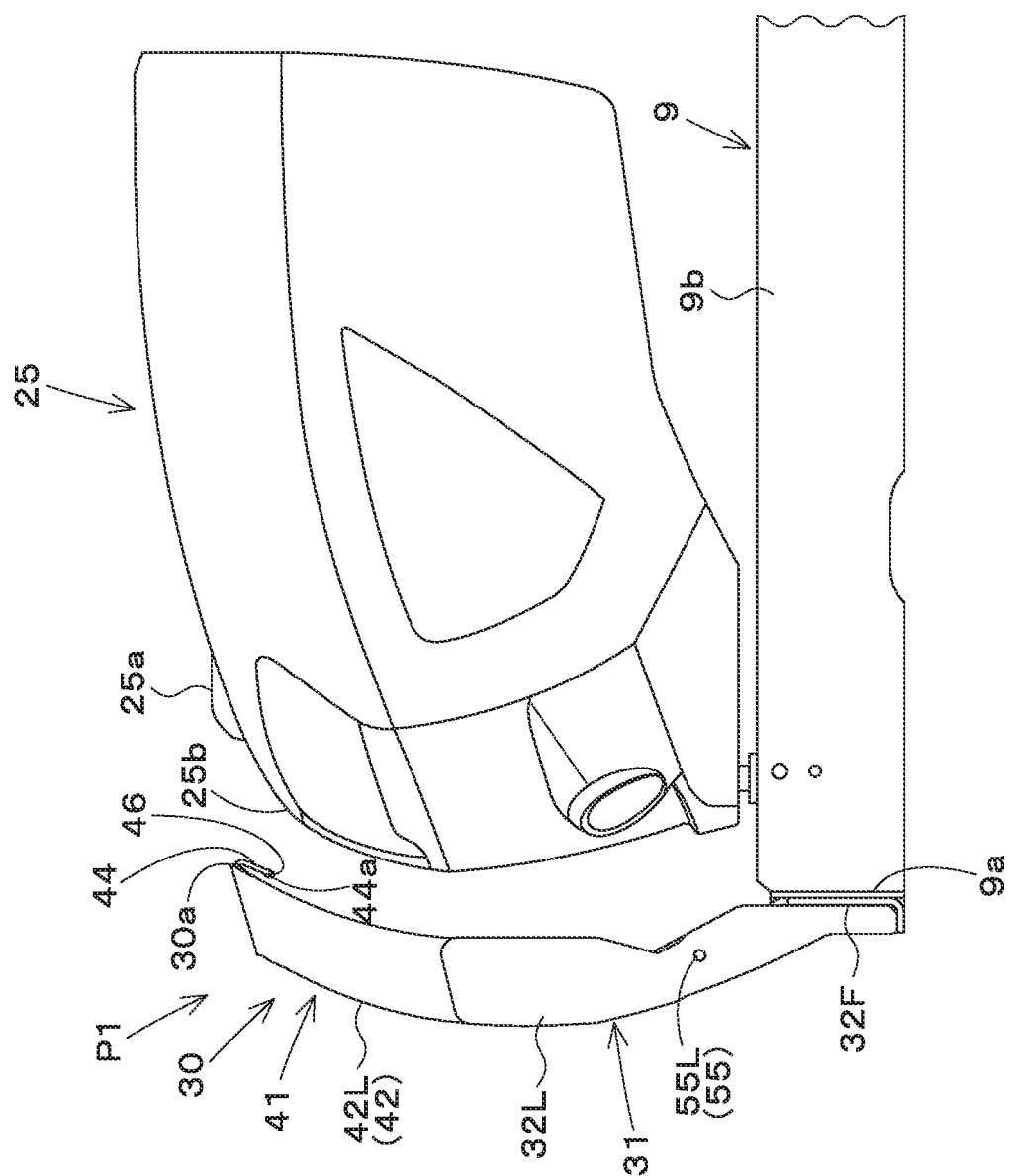
FIG. 10 is a view showing a state where a hood is closed while the upper frame is located in the guard position (standing posture).

As shown in FIGS. 5 and 10, the back edge of the vertical part 42 of the upper frame 41 is curved to be close to and roughly follow the front surface of the hood 25 when the upper frame 41 is located in the guard position P1 (standing posture). Specifically, the back edges of the left part 42L and the right part 42R are curved to be close to and roughly follow the front surface of the hood 25 in side view when the upper frame 41 is located in the guard position P1.

The upper part 43 extends in the vehicle width direction. As shown in FIG. 1, the boundary between the upper part 43 and the left part 42L and the boundary between the upper part 43 and the right part 42R are formed in a rounded shape (arc shape), respectively. Thereby, stress concentration is less likely to occur at the boundaries, so that the strength of the upper frame 41 can be improved. Further, if another object collides with the upper end of the front guard 30, the another object can be prevented from being damaged.

Figure 2:
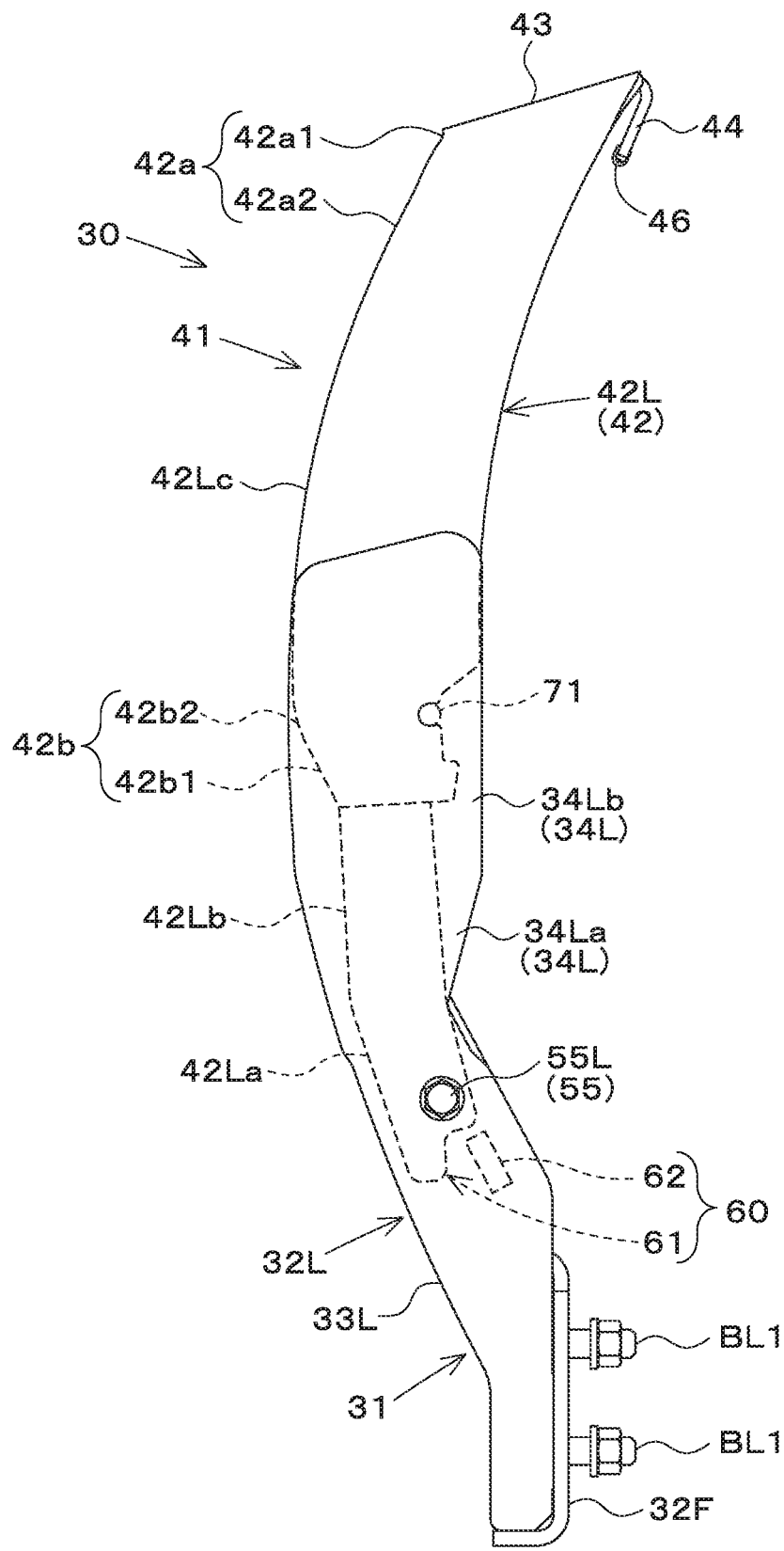
FIG. 2 is a side view of the front guard.
Figure 4:
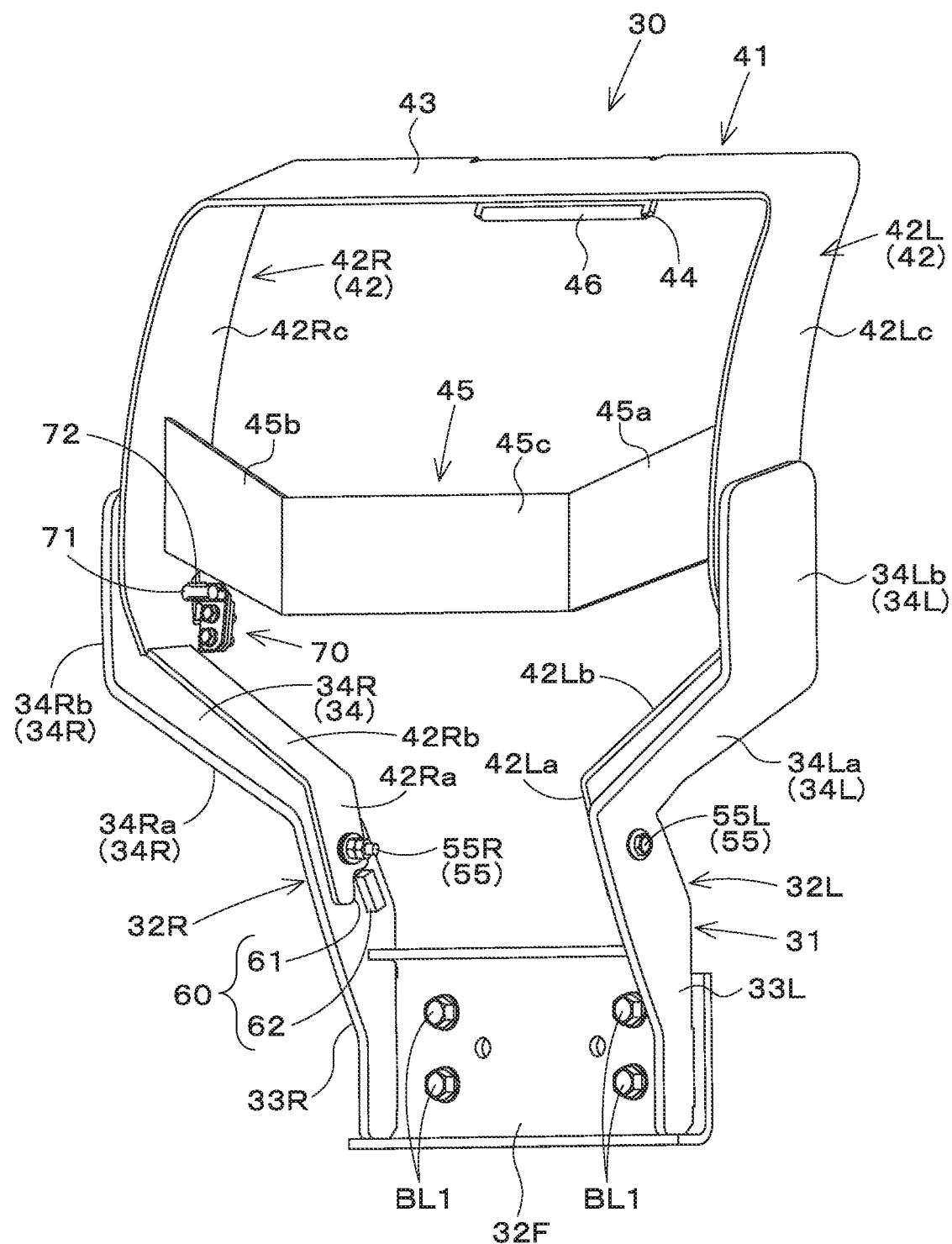
FIG. 4 is a perspective view of the front guard.
Figure 5:
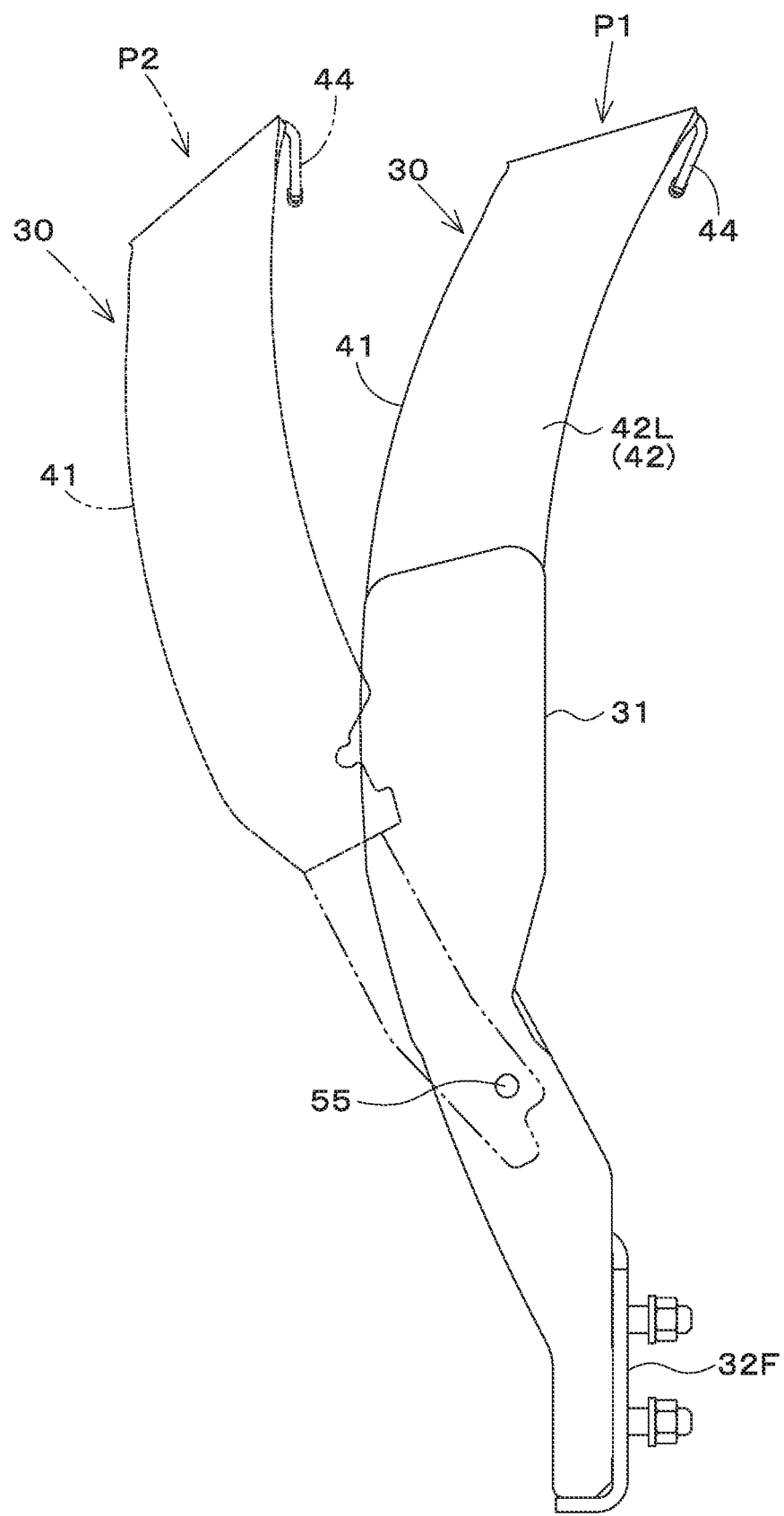
FIG. 5 is a side view for explaining the swing of the front guard.

As shown in FIGS. 1, 2, and 4, the upper part 43 is provided with a protruding portion 44 that protrudes downward. The protruding portion 44 protrudes downward from the center, in the vehicle width direction, of the upper part 43. As shown in FIG. 2, the protruding portion 44 extends downward from the back edge of the upper part 43. The protruding portion 44 is tilted forward as it goes downward. In addition, in side view, the protruding portion 44 is located behind the back edge of the vertical part 42 (left upper part 42Lc, right upper part 42Rc) and extends to roughly follow the same back edge. The protruding portion 44 is formed in a plate shape whose length in the left-right direction is larger than that in the up-down direction. In the present embodiment, the protruding portion 44 is provided integrally with the upper part 43, but the protruding portion 44, which is separate from the upper part 43, may be attached to the upper part 43 by bolts or the like. The protruding portion 44 is provided with an elastic member 46. The elastic member 46 is, for example, rubber, a soft resin, or the like. The elastic member 46 is provided on at least the back surface of the protruding portion 44. In the present embodiment, the elastic member 46 is provided to cover the front surface, lower surface, and back surface of the protruding portion 44.

Since the upper part 43 is provided with the protruding portion 44 that protrudes downward, an operator can hold the protruding portion 44 when the upper frame 41 is changed in posture from the standing posture to the forward leaning posture. That is, the protruding portion 44 can function as a handle when the posture of the upper frame 41 is changed. By holding the protruding portion 44, an operator can easily change the posture of the upper frame 41 from the standing posture to the forward leaning posture.

Figure 3:
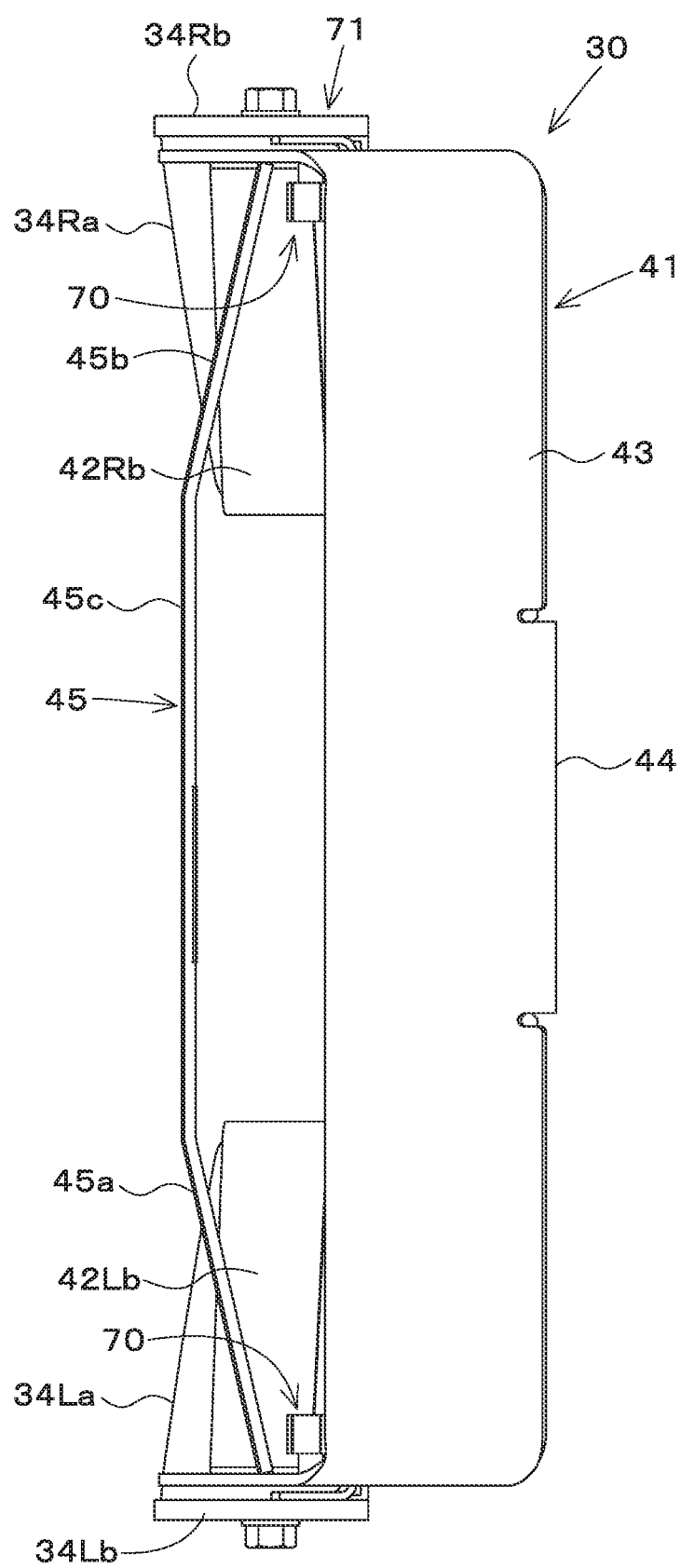
FIG. 3 is a plan view of the front guard.

As shown in FIGS. 1, 3, and 4, the upper frame 41 has a connecting member 45.

The connecting member 45 connects, below the upper part 43, the left part 42L and the right part 42R. The connecting member 45 connects the left upper part 42Lc and the right upper part 42Rc. The connecting member 45 is a flat plate-shaped member, and is arranged such that one surface faces substantially forward and the other surface faces substantially backward. The connecting member 45 has a left plate portion 45a, a right plate portion 45b, and a middle plate portion 45c. The left plate portion 45a, the right plate portion 45b, and the middle plate portion 45c are formed from one plate member. The left plate portion 45a extends rightward from the left upper part 42Lc, and extends downward and forward as it goes rightward. The right plate portion 45b extends leftward from the right upper part 42Rc, and extends downward and forward as it goes leftward. The middle plate portion 45c connects the left plate portion 45a and the right plate portion 45b. As shown in FIG. 3, the connecting member 45 is located in front of the upper part 43 over the entire length thereof in the vehicle width direction.

As shown in FIG. 2, the vertical part 42 of the upper frame 41 has an upper curved portion 42a and a lower curved portion 42b. The upper curved portion 42a and the lower curved portion 42b are formed in the front edge of the vertical part 42.

The upper portion of the upper frame 41 (the upper portion of the vertical part 42) is formed with the upper curved portion 42a. In detail, the upper portion of the left part 42L and the upper portion of the right part 42R are each formed with the upper curved portion 42a. In more detail, the upper portion of the left upper part 42Lc and the upper portion of the right upper part 42Rc are each formed with the upper curved portion 42a.

The lower portion of the upper frame 41 (the lower portion of the vertical part 42) is formed with the lower curved portion 42b. In detail, the lower portion of the left part 42L and the lower portion of the right part 42R are each formed with the lower curved portion 42b. In more detail, the lower portion of the left upper part 42Lc and the lower portion of the right upper part 42Rc are each formed with the lower curved portion 42b.

The upper curved portion 42a and the lower curved portion 42b are continuous and define the front edge of the vertical part 42 (left part 42L and right part 42R). The upper curved portion 42a is curved backward as it goes upward. The lower curved portion 42b is curved backward as it goes downward.

As shown in FIGS. 1, 2, and 4, the pivot shaft 55 (left pivot shaft 55L, right pivot shaft 55R) is formed of a headed bolt, which penetrates the upper frame 41 and the lower frame 31 (specifically, left lower part 42La and left base portion 33L, right lower part 42Ra and right base portion 33R) in the vehicle width direction.

Figure 6:
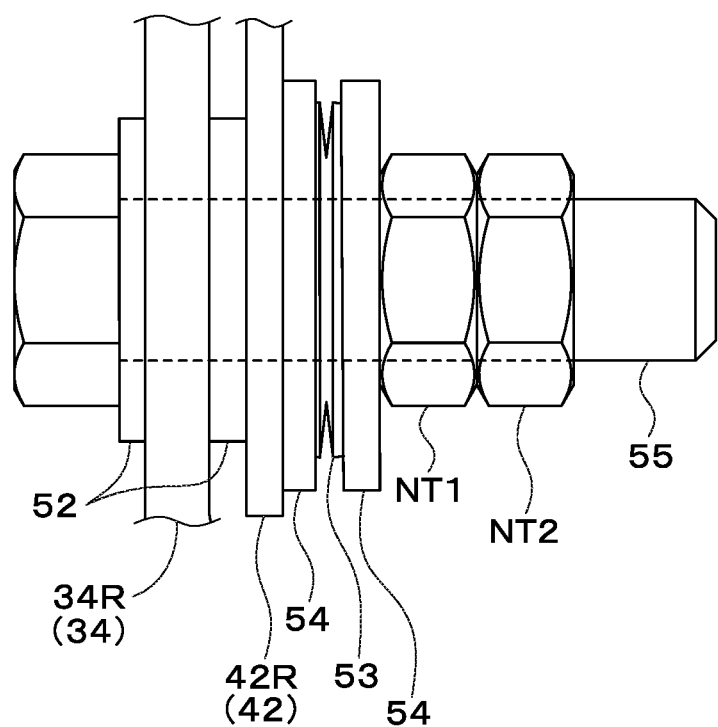
FIG. 6 is a front view showing the periphery of a pivot shaft.

As shown in FIG. 6, the pivot shaft 55 penetrates a pair of first plain washers 52, a disc spring 53, and a pair of second plain washers 54. The pair of first plain washers 52 is arranged to sandwich the extending portion 34. The disc spring 53 is arranged on the vehicle inward side of the vertical part 42. The pair of second plain washers 54 is arranged to sandwich the disc spring 53. A tightening nut NT1 and a lock nut NT2 are screwed onto the threaded portion of the pivot shaft 55. The tightening nut NT1 is in contact with the second plain washer 54 from the vehicle inward side.

By tightening the tightening nut NT1, the posture of the upper frame 41 with respect to the lower frame 31 can be fixed. By loosening the tightening nut NT1, the upper frame 41 can be swung with respect to the lower frame 31, so that the posture of the upper frame 41 can be changed.

When the tightening force of the tightening nut NT1 is small, the upper frame 41 can be swung with respect to the lower frame 31, and the swing position of the upper frame 41 with respect to the lower frame 31 is maintained by the force acting from the disc spring 53. Therefore, when an unintended external force acts on the upper frame 41, the upper frame 41 can swing according to the external force, and the swing position thereof at the time when the external force no longer acts is maintained. Thereby, the front guard 30 can be prevented from being damaged when an unintended external force is applied to the upper frame 41 due to an erroneous operation by an operator or the like.

As shown in FIGS. 1, 2, and 4, the front guard 30 has regulation mechanisms 60 that regulate the swing range of the upper frame 41 with respect to the lower frame 31. The regulation mechanisms 60 regulate the swing range of the upper frame 41 to a range between the guard position P1 and the retracted position P2.

Each of the regulation mechanisms 60 is provided on each of the left and right portions of the front guard 30. The regulation mechanism 60 has a regulation part 61 and a stopper plate 62. The regulation part 61 is formed at the lower portion of the upper frame 41.

Figure 7:
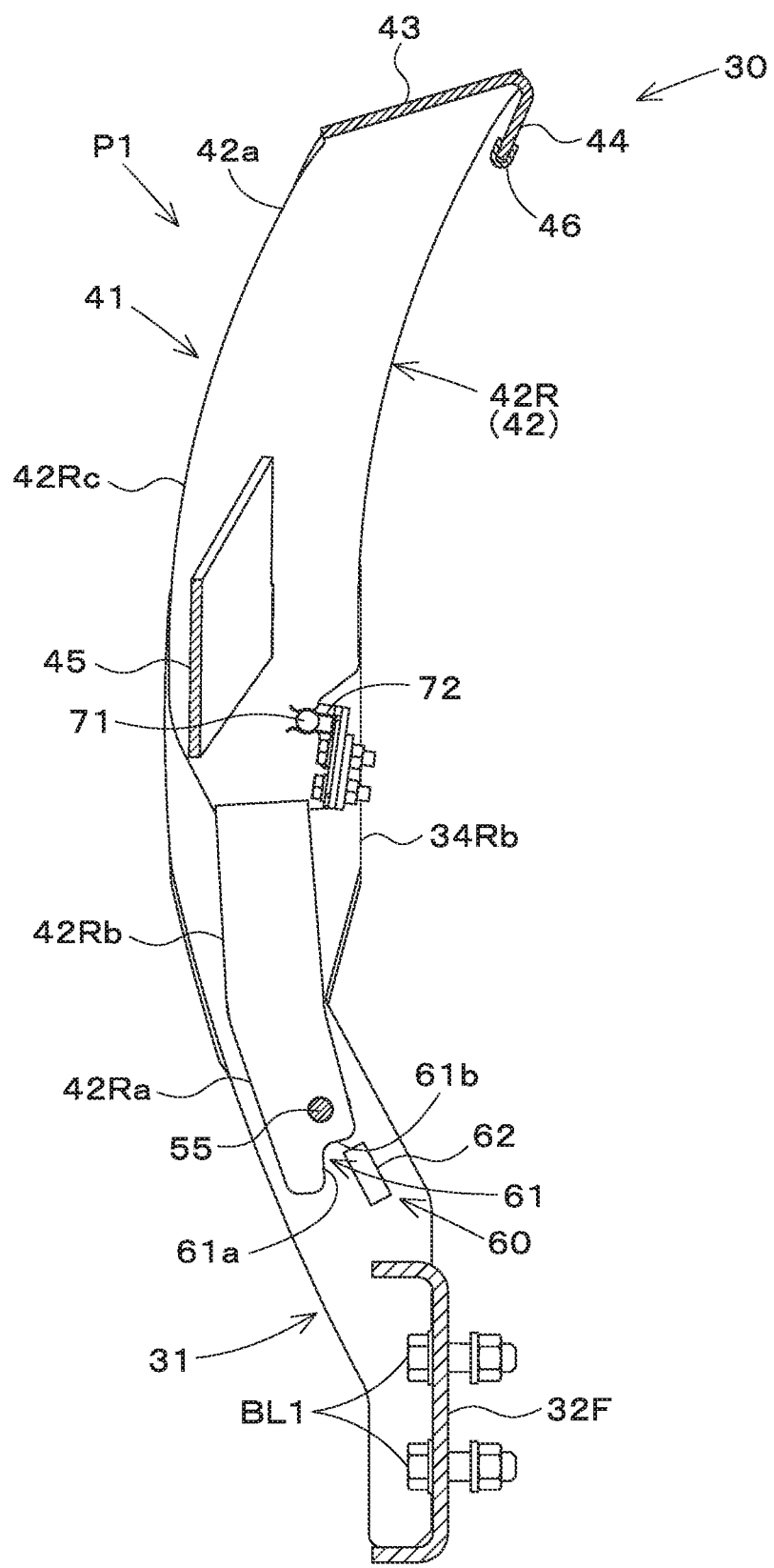
FIG. 7 is a vertical cross-sectional view of the front guard while an upper frame is located in a guard position (standing posture).

As shown in FIG. 7, the regulation part 61 has a first regulation surface 61a and a second regulation surface 61b. The first regulation surface 61a is a surface facing backward and extends substantially in the up-down direction. The second regulation surface 61b is a surface facing downward and extends substantially in the front-back direction. The upper portion of the first regulation surface 61a and the front portion of the second regulation surface 61b are connected by an arc-shaped surface.

The stopper plate 62 is a quadrangular plate in side view. The stopper plate 62 is fixed to the surface, on the vehicle inward side, of each of the left base portion 33L and the right base portion 33R. The stopper plate 62 is tilted forward as it goes upward.

Figure 8:
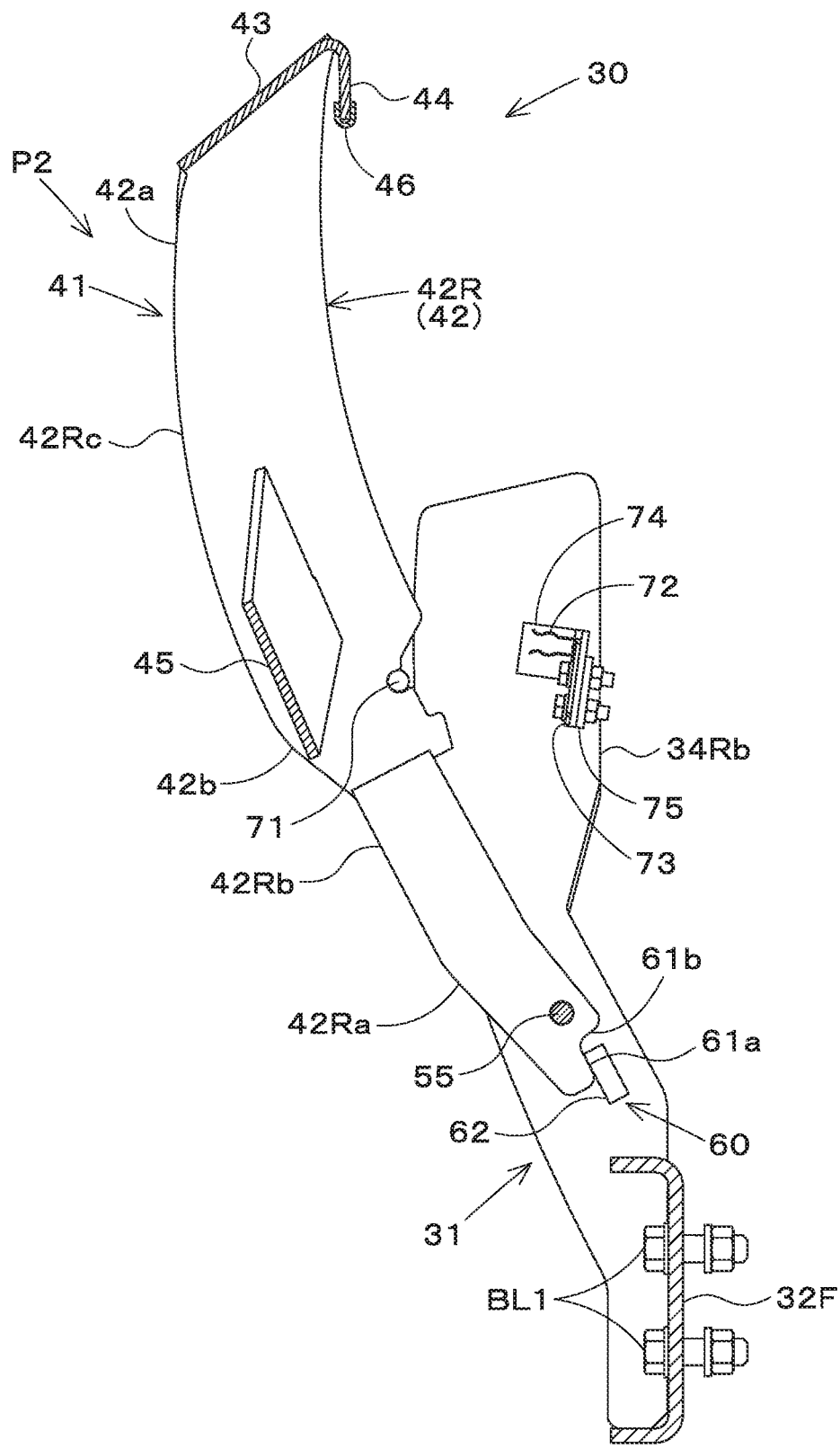
FIG. 8 is a vertical cross-sectional view of the front guard while the upper frame is located in a retracted position (forward leaning posture).

As shown in FIG. 7, when the upper frame 41 is located in the guard position P1, the stopper plate 62 is located in a position where it does not come into contact with the regulation part 61. As shown in FIG. 8, when the upper frame 41 is swung from the guard position P1 to the retracted position P2, the stopper plate 62 comes into contact with the first regulation surface 61a of the regulation part 61. Thereby, the upper frame 41 is regulated from swinging forward from the retracted position P2. When the upper frame 41 swings backward from the guard position P1, the stopper plate 62 comes into contact with the second regulation surface 61b of the regulation part 61. Thereby, the upper frame 41 is regulated from swinging backward far beyond the guard position P1.

Figure 9:
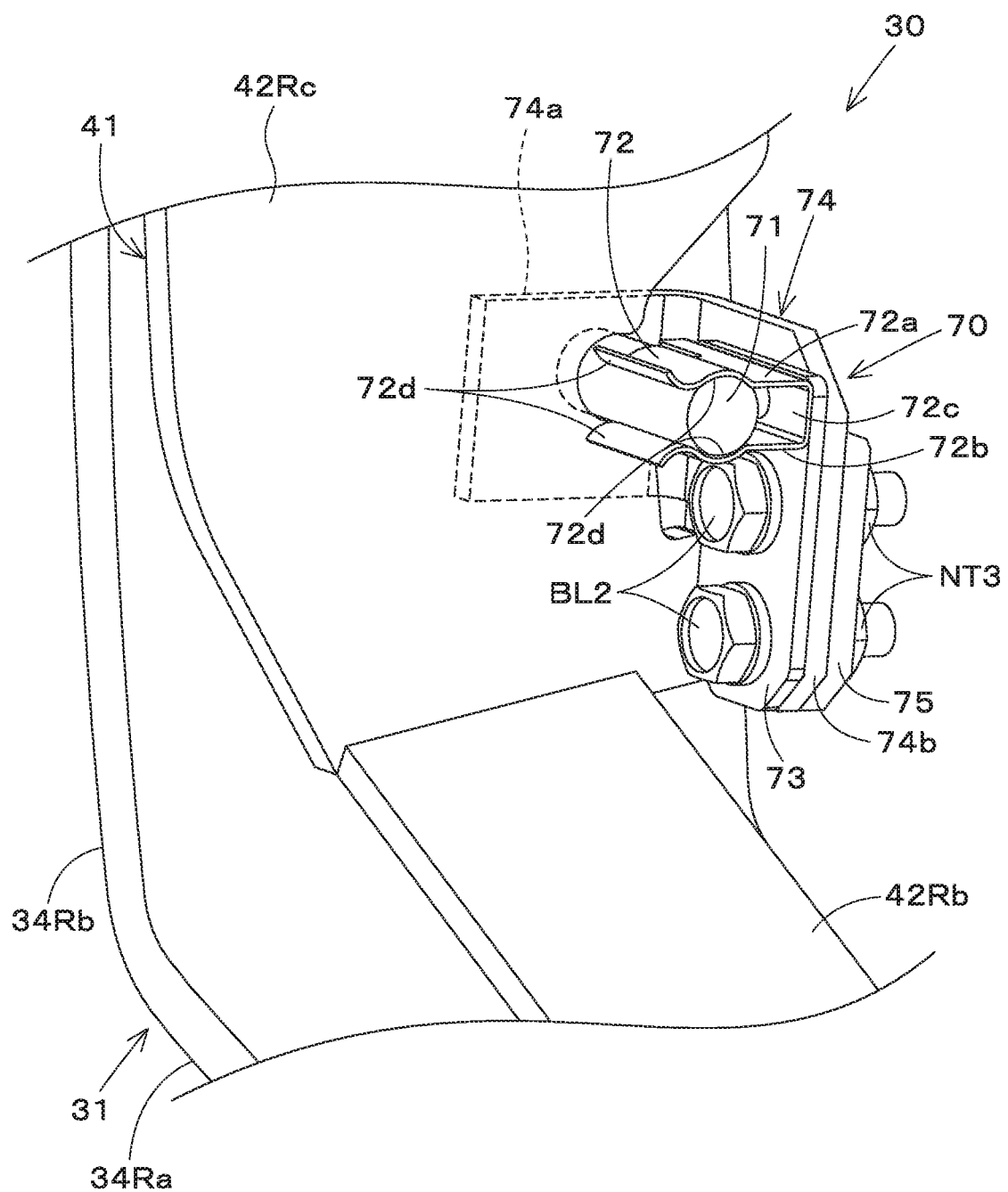
FIG. 9 is a view showing a holding mechanism.

As shown in FIGS. 1, and 7 to 9, the front guard 30 has a holding mechanism 70 that holds the upper frame 41 in the guard position. As shown in FIG. 9, the holding mechanism 70 has a pin 71, a receiving member 72, a first member 73, a second member 74, and a third member 75.

The pin 71 is fixed to the vertical part 42 of the upper frame 41. The respective pins 71 are fixed to the left part 42L and the right part 42R, and extend in the vehicle width direction. One pin 71 extends rightward from the left part 42L. The other pin 71 extends leftward from the right part 42R. The shape of the pin 71 is a cylinder or a polygonal prism (hexagon, octagon, etc.). The pin 71 is fixed to the lower back portion of each of the left upper part 42Lc and the right upper part 42Rc.

The receiving member 72 is formed of a flexible plate member (thin metal plate or the like). The receiving member 72 has an upper plate 72a, a lower plate 72b, and a back plate 72c. The upper plate 72a and the lower plate 72b are arranged substantially parallel so as to be spaced apart in the up-down direction, and extend in the front-back direction. The back plate 72c connects the back end of the upper plate 72a and the back end of the lower plate 72b. The receiving member 72 has a wide portion 72d with a wide space between the upper plate 72a and the lower plate 72b. The wide portion 72d is a portion where the space between the upper plate 72a and the lower plate 72b is larger than another portion (hereinafter referred to as a "narrow portion"). Two wide portions 72d are provided. One wide portion 72d is provided between the front end portion of the upper plate 72a and the front end portion of the lower plate 72b. The other wide portion 72d is provided between the intermediate portion, in the front-back direction, of the upper plate 72a and the intermediate portion, in the front-back direction, of the lower plate 72b. The space of the wide portion 72d is set to be larger than or equal to the outer diameter of the pin 71. The space of the narrow portion is set to be smaller than the outer diameter of the pin 71. The receiving member 72 is fixed to the first member 73.

The first member 73 is a plate-shaped member, one surface of which faces forward and the other surface of which faces backward. The back plate 72c of the receiving member 72 is fixed to the one surface. The first member 73 is fixed to the second member 74.

The second member 74 is fixed to the lower frame 31. The second member 74 has a fixing portion 74a and an attachment portion 74b. The fixing portion 74a is fixed to the surface, on the vehicle inward side, of the extending portion 34 (left upper extending portion 34Lb, right upper extending portion 34Rb) of the lower frame 31. The attachment portion 74b bends from the back end of the fixing portion 74a and extends toward the vehicle inward side. The attachment portion 74b has a plate shape, one surface of which faces forward and the other surface of which faces backward. The first member 73 is attached to the one surface (front surface).

The third member 75 is attached to the other surface (back surface) of the attachment portion 74b. The first member 73 and the third member 75 are attached to the attachment portion 74b by the bolt BL2 and the nut NT3.

As shown in FIG. 8, when the upper frame 41 is located in the retracted position P2, the pin 71 is located in a position forward away from the receiving member 72 and is not held by the receiving member 72. In this state, the upper frame 41 can swing backward.

When the upper frame 41 swings backward from the state shown in FIG. 8, the pin 71 hits one of the wide portions 72d of the receiving member 72, and then the pin 71 moves backward while widening the space between the upper plate 72a and the lower plate 72b. When the upper frame 41 reaches the guard position P1 (see FIG. 7), the pin 71 is held by the other wide portion 72d (see FIG. 9), and the backward swing of the upper frame 41 stops. In this state, the pin 71 is sandwiched from above and below by the upper plate 72a and the lower plate 72b, so that the upper frame 41 is held in the guard position P1. Therefore, the upper frame 41 does not swing unless an external force is applied to the upper frame 41.

When an external force that swings the upper frame 41 forward is applied from the state shown in FIG. 7, the pin 71 moves forward while pushing out the narrow portion of the receiving member 72, and comes off from the receiving member 72. Thereby, the upper frame 41 can swing forward.

The front guard 30 according to the present invention is characterized in that even if an operator makes an erroneous operation in which the front guard 30 and a part of the work vehicle 1 come into contact with each other, the front guard 30 can be prevented from being damaged. This feature will be described in detail below.

As an example of the erroneous operation, the hood 25 may be opened while the upper frame 41 is located in the guard position (standing posture). This case will be described below.

FIG. 10 shows a state where the hood 25 is closed while the upper frame 41 is located in the guard position (standing posture). In this state, an upper end 30a of the front guard 30 is located below the upper end of the raised portion 25a of the hood 25. In addition, a lower end 44a of the protruding portion 44 is located above an upper end 25b of the front edge of the hood 25. In addition, the protruding portion 44 is located behind the front end of the hood 25.

When the hood 25 is opened from the state shown in FIG. 10, the upper surface of the hood 25 comes into contact with the protruding portion 44. Specifically, the raised portion 25a provided on the upper surface of the hood 25 comes into contact with the back surface of the protruding portion 44. That is, the protruding portion 44 is located in a position where it comes into contact with the upper surface (raised portion 25a) of the hood 25 when the hood 25 is opened while the upper frame 41 is located in the guard position (standing posture). In other words, the protruding portion 44 is located on the movement trajectory of the upper surface (raised portion 25a) of the hood 25 when the hood 25 is opened while the upper frame 41 is located in the guard position (standing posture).

Figure 11:
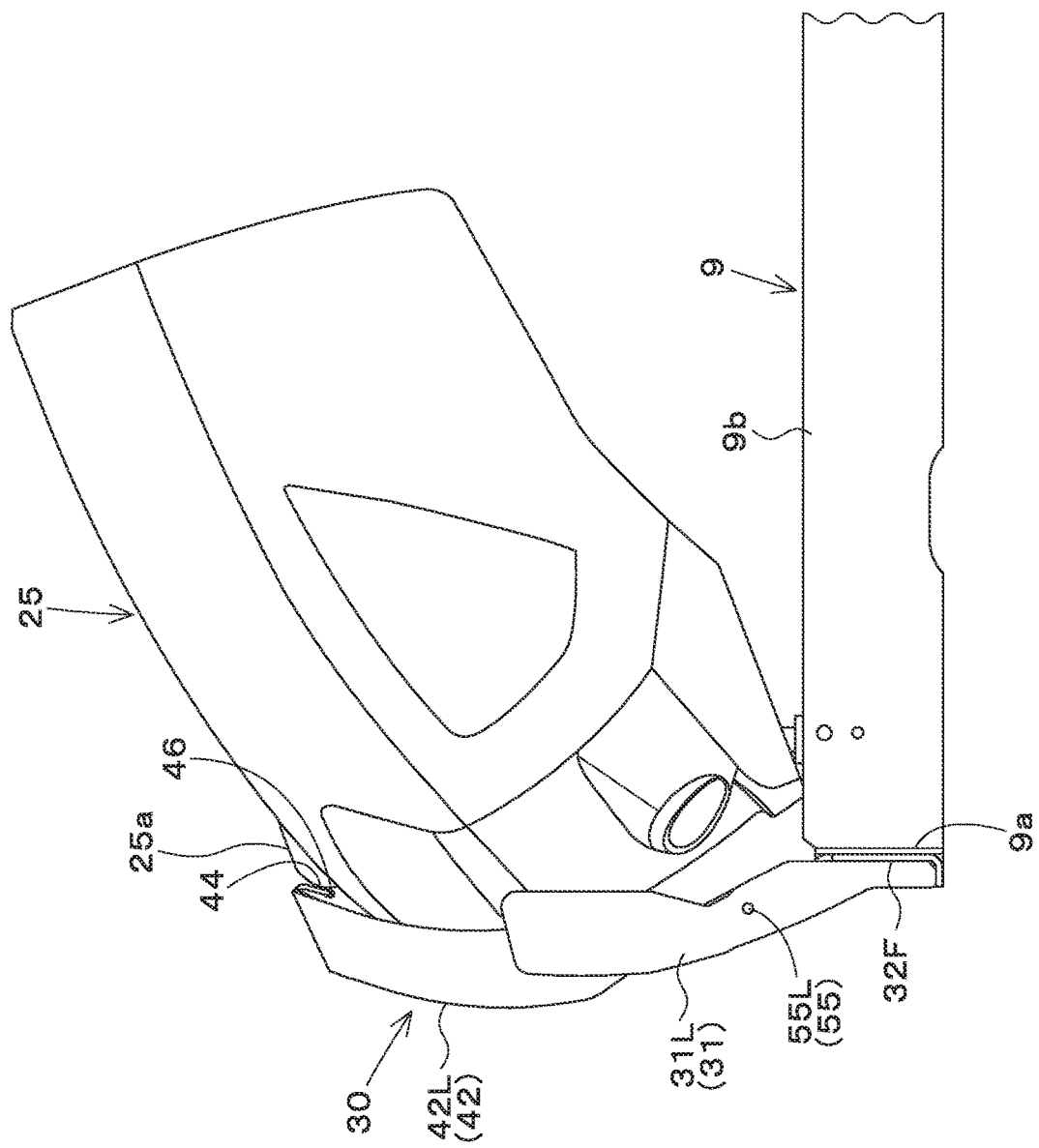
FIG. 11 is a view showing a state where the hood is opened from the state shown in FIG. 10.
Figure 12:
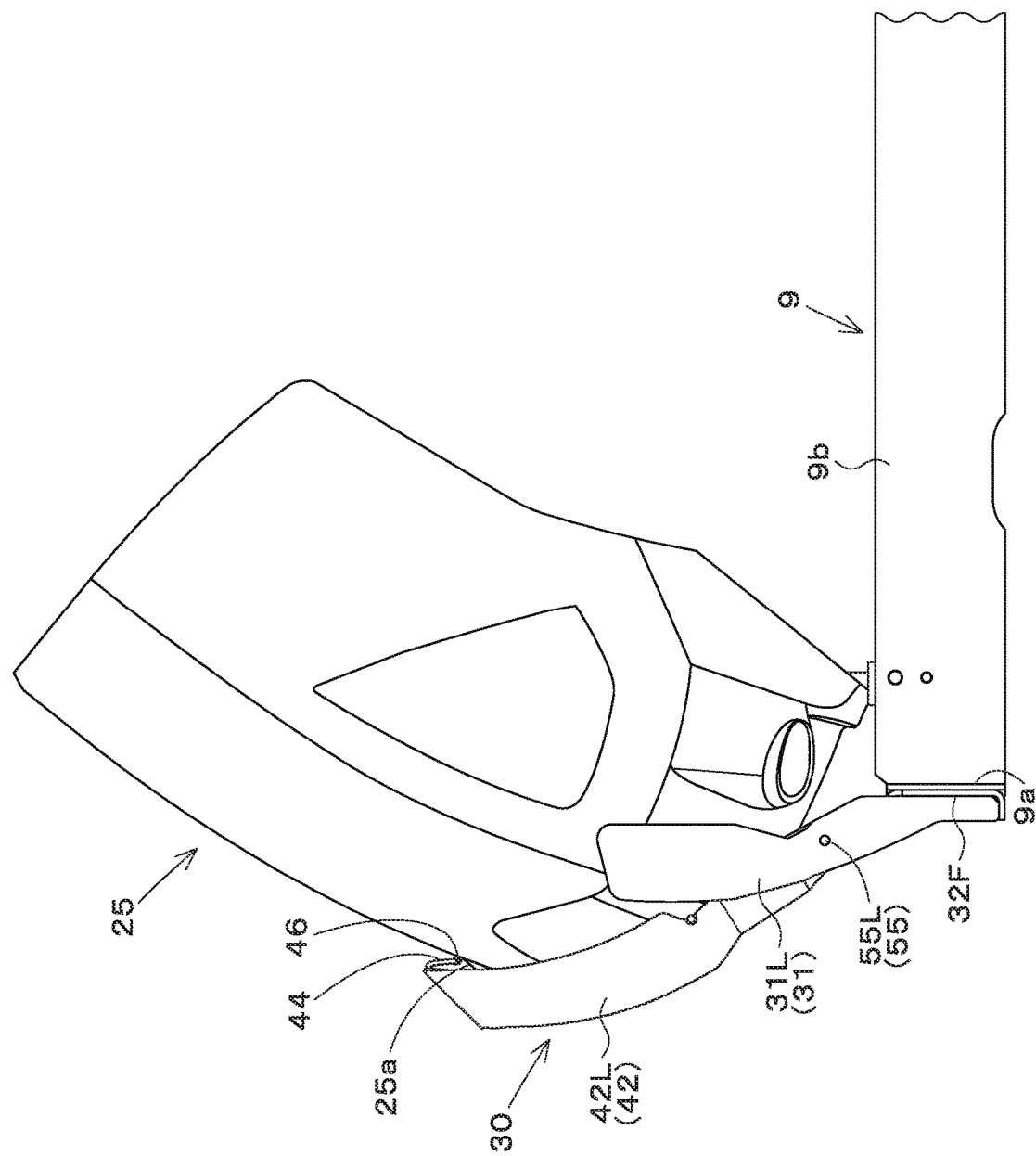
FIG. 12 is a view showing a state where the hood is further opened from the state shown in FIG. 11.

When the hood 25 is further opened while the protruding portion 44 is in contact with the upper surface of the hood 25, the upper frame 41 is pushed forward by the hood 25, and swings from the guard position (standing position) toward the retracted position (forward leaning position) (see FIG. 11). When the hood 25 is further opened from the state shown in FIG. 11 so as to be completely opened, the upper frame 41 is pushed further forward by the hood 25, and moves to the retracted position (forward leaning posture) (see FIG. 12).

As described above, even if the hood 25 is opened while the upper frame 41 is located in the guard position (standing posture), the protruding portion 44 comes into contact with the upper surface of the hood 25 and is pushed forward as the hood 25 is opened. Thereby, the upper frame 41 swings from the guard position (standing position) toward the retracted position (forward leaning position). Thereby, it is avoided that an excessive force may act on the front guard 30, so that the front guard 30 can be prevented from being damaged. Further, since the elastic member 46 is provided on the protruding portion 44, the hood 25 and the front guard 30 can be prevented from being damaged when the upper surface of the hood 25 comes into contact with the protruding portion 44.

In the above example, the case where the protruding portion 44 comes into contact with the raised portion 25a provided on the upper surface of the hood 25 has been described, but the raised portion 25a on the upper surface of the hood 25 may not be provided. In this case, when the hood 25 is opened while the front guard 30 is located in the standing position, the protruding portion 44 comes into contact with the upper surface of the hood 25 without the raised portion 25a.

As another example of the erroneous operation, the front loader 12 may be raised while the upper frame 41 is located in the retracted position (forward leaning posture). This case will be described below.

FIG. 13 shows a state where the front loader 12 is lowered while the upper frame 41 is located in the retracted position (forward leaning posture). In this state, a part of the front loader 12 (coupling portion 81M of the stand 80) is located in front of the front guard 30 and is not in contact with the front guard 30.

Figure 14:
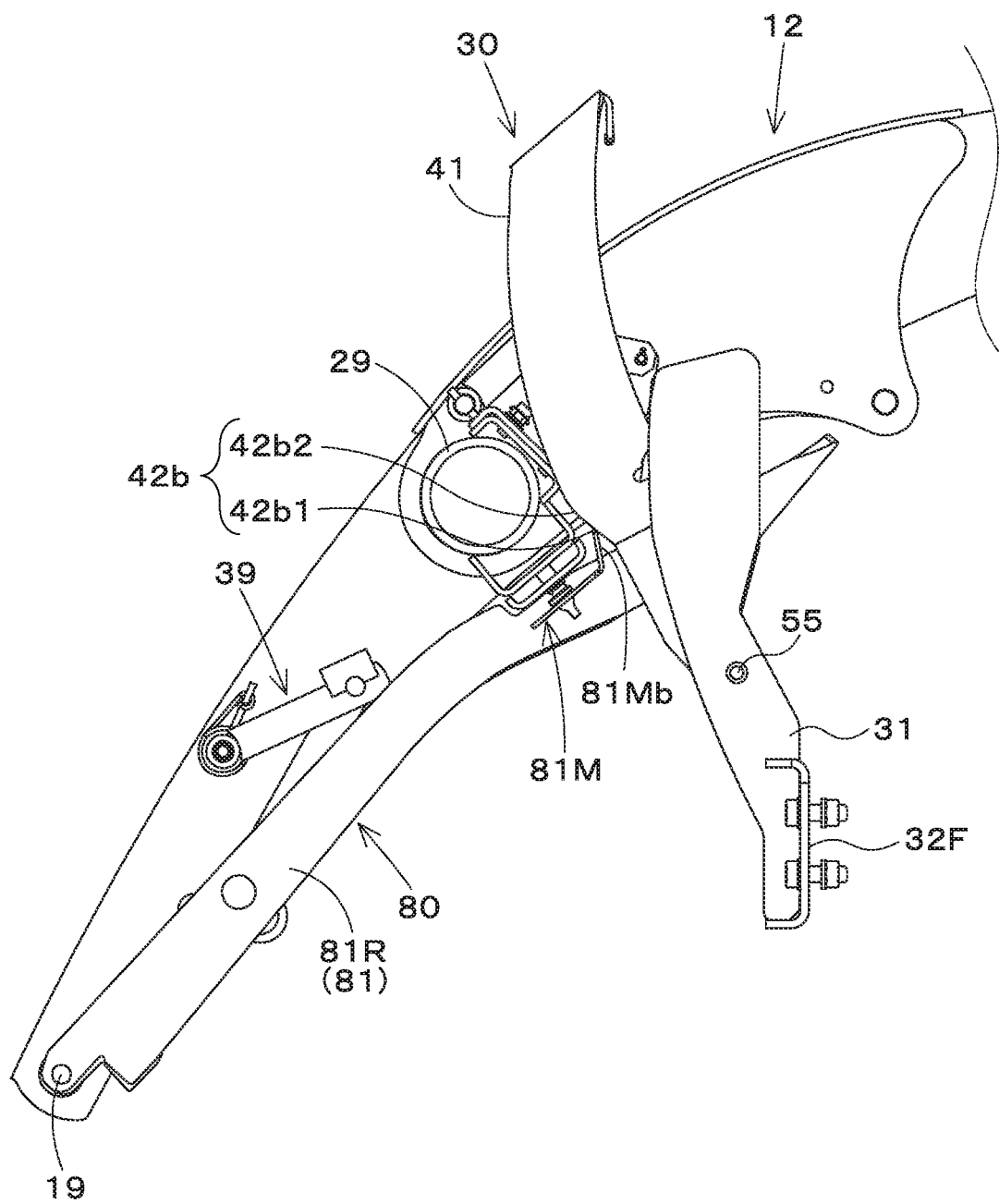
FIG. 14 is a view showing a state where the front loader is raised from the state shown in FIG. 13.

When the front loader 12 is raised from the state shown in FIG. 13, the part of the front loader 12 comes into contact with the lower curved portion 42b (see FIG. 14). Here, the part of the front loader 12 is the stand 80. Specifically, the part of the front loader 12 is the coupling portion 81M of the stand 80. More specifically, the part of the front loader 12 is the back part 81Mb of the coupling portion 81M of the stand 80.

That is, the lower curved portion 42b has a portion (hereinafter, referred to as a "first lower region 42b1") that the part of the front loader 12 (coupling portion 81M) comes into contact with when the front loader 12 is raised while the upper frame 41 is located in the retracted position (forward leaning posture). The first lower region 42b1 is located on the movement trajectory of the part of the front loader 12 (coupling portion 81M) when the front loader 12 is raised while the upper frame 41 is located in the retracted position (forward leaning posture). The first lower region 42b1 is a portion that a part of the front loader 12 (coupling portion 81M of the stand 80) first comes into contact with when the front loader 12 is raised while the upper frame 41 is located in the retracted position (forward leaning posture).

As shown in FIGS. 2 and 14, the lower curved portion 42b has a second lower region 42b2 that is curved forward as it goes upward from the first lower region 42b1. As shown in FIG. 14, the second lower region 42b2 is curved forward as it goes upward from the first lower region 42b1 while the upper frame 41 is located in the retracted position (forward leaning posture). In addition, as shown in FIG. 2, the second lower region 42b2 is curved forward as it goes upward from the first lower region 42b1 while the upper frame 41 is located in the guard position (standing posture).

Figure 15:
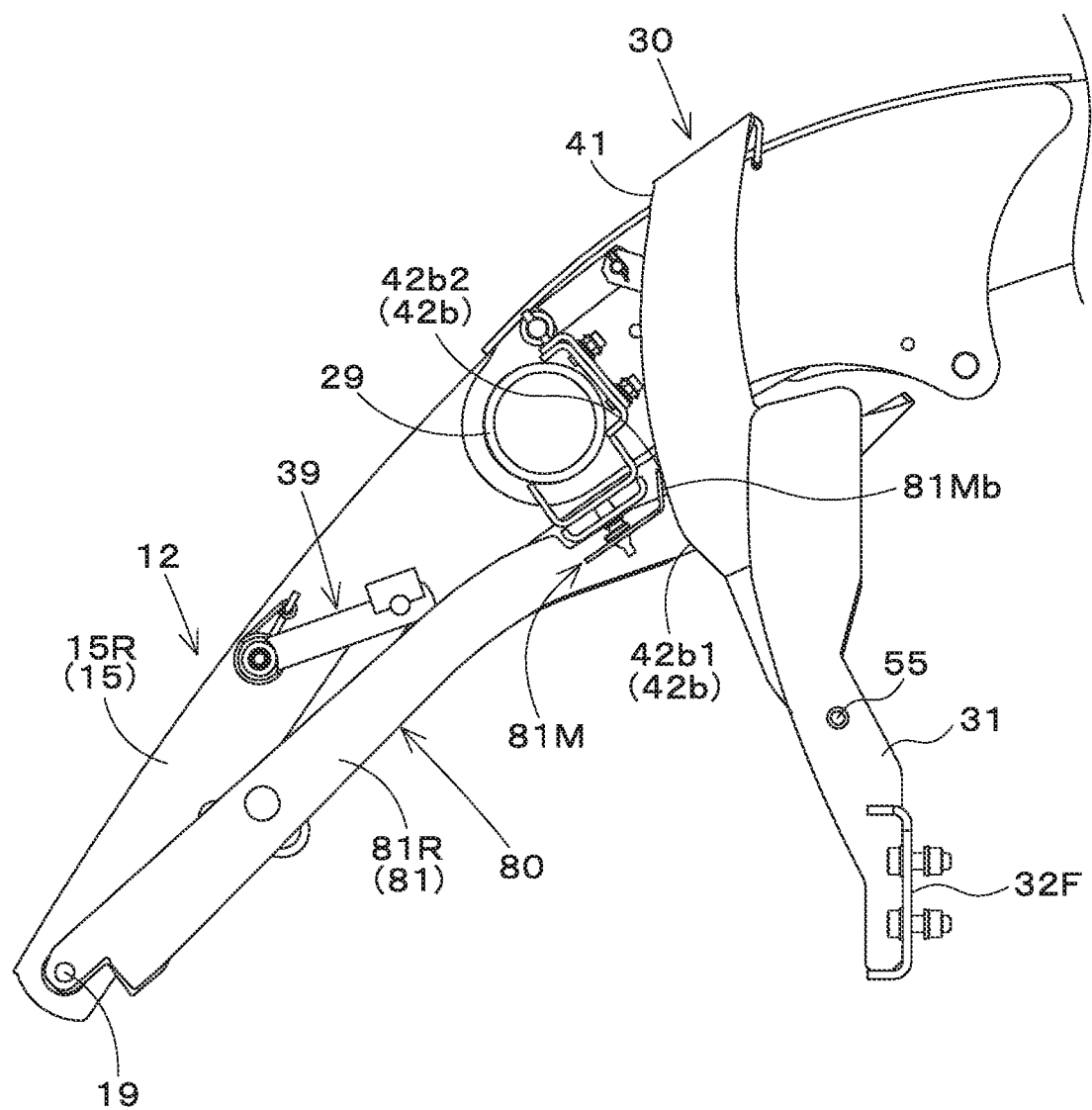
FIG. 15 is a view showing a state where the front loader is further raised from the state shown in FIG. 14.

When the front loader 12 is further raised from the state shown in FIG. 14, the part of the front loader 12 (coupling portion 81M) moves upward from the first lower region 42b1 along the second lower region 42b2. Along with this movement, the upper frame 41 is pushed backward by the part of the front loader 12 (coupling portion 81M) and swings from the retracted position (forward leaning posture) toward the guard position (standing posture) (see FIG. 15). When the front loader 12 is further raised from the state shown in FIG. 15, the part of the front loader 12 (coupling portion 81M) moves further upward along the second lower region 42b2. Thereby, the upper frame 41 moves to the guard position (standing posture) or a nearby position.

As described above, even if the front loader 12 is raised while the upper frame 41 is located in the retracted position (forward leaning posture), a part of the front loader 12 (coupling portion 81M) comes into contact with the lower curved portion 42b and moves upward from the first lower region 42b1 along the second lower region 42b2 as the front loader 12 is raised. Thereby, the upper frame 41 swings from the retracted position (forward leaning posture) toward the guard position (standing posture). Thereby, it is avoided that an excessive force may act on the front guard 30, so that the front guard 30 can be prevented from being damaged.

As yet another example of the erroneous operation, the front loader 12 may be lowered while the upper frame 41 is located in the retracted position (forward leaning posture). This case will be described below.

FIG. 16 shows a state where the front loader 12 is raised while the upper frame 41 is located in the retracted position (forward leaning posture). In this state, a part of the front loader 12 (coupling portion 81M of the stand 80) is located above the front guard 30 and is not in contact with the front guard 30.

Figure 17:
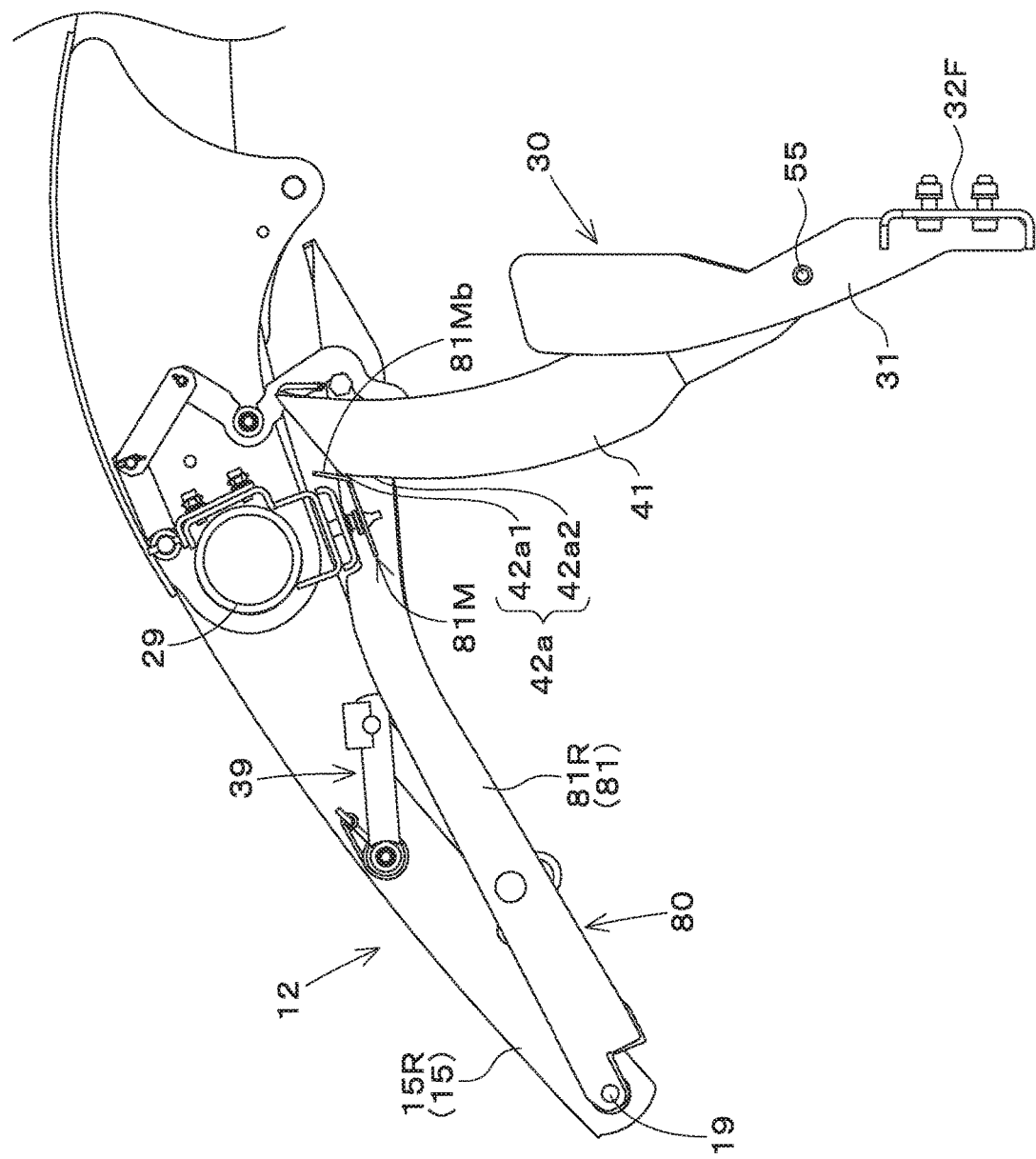
FIG. 17 is a view showing a state where the front loader is lowered from the state shown in FIG. 16.

When the front loader 12 is lowered from the state shown in FIG. 16, the part of the front loader 12 comes into contact with the upper curved portion 42a (see FIG. 17). Here, the part of the front loader 12 is the stand 80. Specifically, the part of the front loader 12 is the coupling portion 81M of the stand 80. More specifically, the part of the front loader 12 is the back part 81Mb of the coupling portion 81M of the stand 80.

That is, the upper curved portion 42a has a portion (hereinafter, referred to as a "first upper region 42a1") that the part of the front loader 12 (coupling portion 81M) comes into contact with when the front loader 12 is lowered while the upper frame 41 is located in the retracted position (forward leaning posture). The first upper region 42a1 is located on the movement trajectory of the part of the front loader 12 (coupling portion 81M) when the front loader 12 is lowered while the upper frame 41 is located in the retracted position (forward leaning posture). The first upper region 42a1 is a portion that the part of the front loader 12 (coupling portion 81M of the stand 80) first comes into contact with when the front loader 12 is lowered while the upper frame 41 is located in the retracted position (forward leaning posture).

As shown in FIGS. 2 and 17, the upper curved portion 42a has a second upper region 42a2 that is curved forward as it goes downward from the first upper region 42a1. As shown in FIG. 17, the second upper region 42a2 is curved forward as it goes downward from the first upper region 42a1 while the upper frame 41 is located in the retracted position (forward leaning posture). In addition, as shown in FIG. 2, the second upper region 42a2 is curved forward as it goes downward from the first upper region 42a1 while the upper frame 41 is located in the guard position (standing posture).

Figure 18:
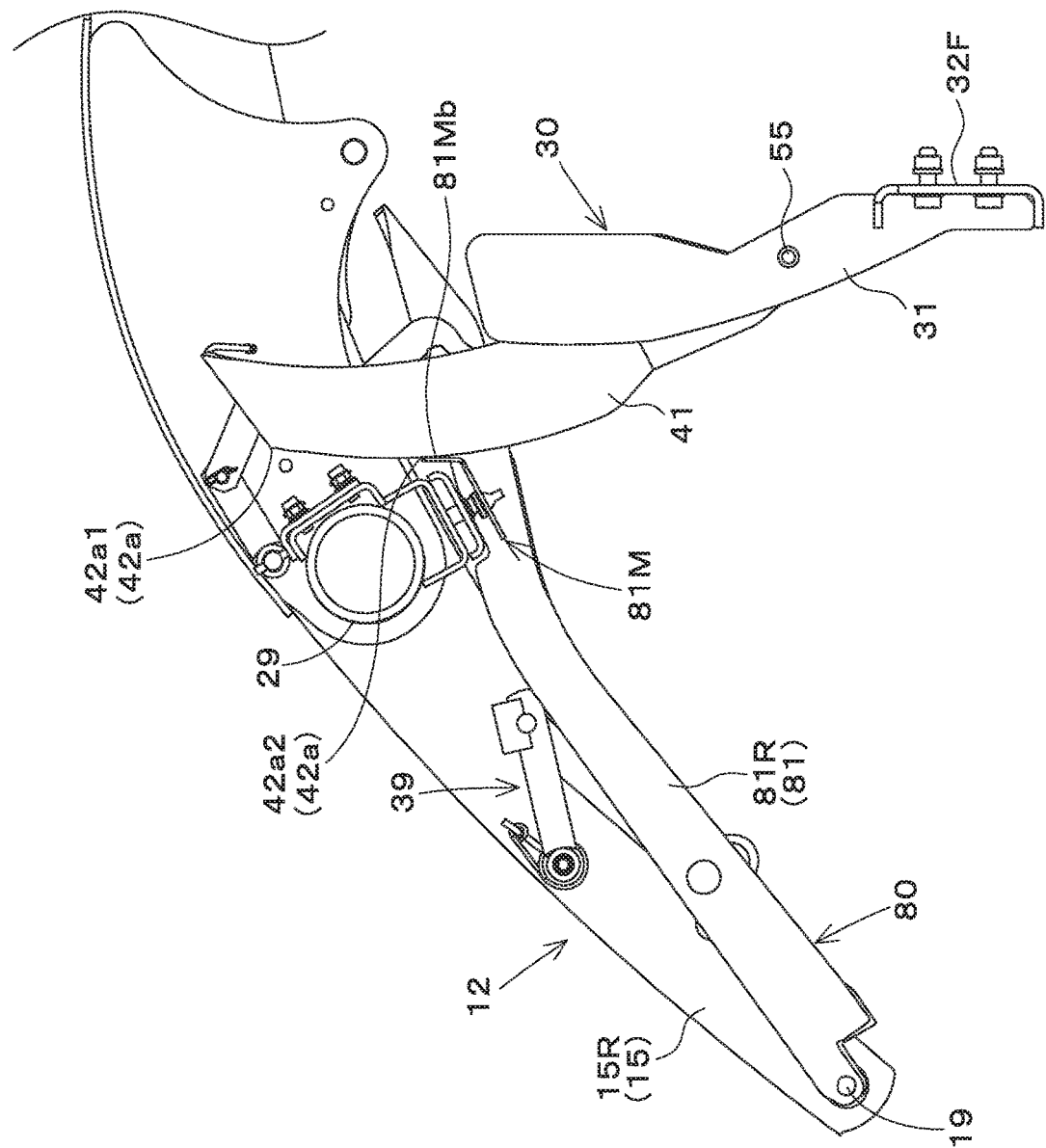
FIG. 18 is a view showing a state where the front loader is further lowered from the state shown in FIG. 17.

When the front loader 12 is further lowered from the state shown in FIG. 17, a part of the front loader 12 (coupling portion 81M) moves downward from the first upper region 42a1 along the second upper region 42a2. Along with this movement, the upper frame 41 is pushed backward by the part of the front loader 12 (coupling portion 81M) and swings from the retracted position (forward leaning posture) toward the guard position (standing posture) (see FIG. 18). When the front loader 12 is further lowered from the state shown in FIG. 18, the part of the front loader 12 (coupling portion 81M) moves further downward along the second upper region 42a2. Thereby, the upper frame 41 moves to the guard position (standing posture) or a nearby position.

As described above, even if the front loader 12 is lowered while the upper frame 41 is located in the retracted position (forward leaning posture), a part of the front loader 12 (coupling portion 81M) comes into contact with the upper curved portion 42a and moves downward from the first upper region 42a1 along the second upper region 42a2 as the front loader 12 is lowered. Thereby, the upper frame 41 swings from the retracted position (forward leaning posture) toward the guard position (standing posture). Thereby, it is avoided that an excessive force may act on the front guard 30, so that the front guard 30 can be prevented from being damaged.

The part of the front loader 12 described above does not necessarily have to be the coupling portion 81M of the stand 80, and may be another portion of the stand 80 or a portion of the front loader 12 other than the stand 80. It is enough if the part of the front loader 12 described above is a portion that comes into contact with the upper curved portion 42a when the front loader 12 is lowered while the upper frame 41 is located in the retracted position (standing posture) and that comes into contact with the lower curved portion 42b when the front loader 12 is raised while the upper frame 41 is located in the retracted position (forward leaning posture). Such a portion is provided between the left boom 15L and right boom 15R of the front loader 12.

According to the front guard 30 of the above embodiment, the following effects are obtained.

The front guard 30, which is attached to the front portion of the vehicle body 2 of the work vehicle 1, includes: the lower frame 31 attached to the vehicle body 2; and the upper frame 41 that is attached to the lower frame 31 so as to be swingable around the shaft oriented in the vehicle width direction and the posture of which can be changed between a standing posture and a forward leaning posture by swinging with respect to the lower frame 31. The upper frame 41 has: the left part 42L that is pivotally supported by the left portion of the lower frame 31 and extends upward; the right part 42R that is pivotally supported by the right portion of the lower frame 31 and extends upward; and the upper part 43 that couples the upper portion of the left part 42L and the upper portion of the right part 42R. The upper part 43 is provided with the protruding portion 44 that protrudes downward.

According to this configuration, it can be configured such that when the hood 25 is opened while the front guard 30 is attached to the vehicle body 2 and the upper frame 41 is located in the standing posture (guard position), the hood 25 hits the protruding portion 44. Thereby, the front guard 30 can be swung from the standing posture (guard position) toward the forward leaning posture (retracted position) as the hood 25 is opened, so that the front guard 30 can be prevented from being damaged. Further, when an operator changes the upper frame 41 from the standing posture to the forward leaning posture, the operator can hold the protruding portion 44. Thereby, the upper frame 41 can be easily changed from the standing posture to the forward leaning posture.

In addition, the lower portion of the left part 42L and the lower portion of the right part 42R are each formed with the lower curved portion 42b that is curved backward as it goes downward.

According to this configuration, it can be configured such that when the upper frame 41 is set in the forward leaning posture (retracted position) while the front loader 12 mounted on the front portion of the work vehicle 1 is lowered and when the front loader 12 is raised as it is, a part of the front loader 12 moves along the lower curved portion 42b. Thereby, the front guard 30 can be swung from the forward leaning posture (retracted position) toward the standing posture (guard position) as the front loader 12 is raised, so that the front guard 30 can be prevented from being damaged.

In addition, the upper portion of the left part 42L and the upper portion of the right part 42R are each formed with the upper curved portion 42a that is curved backward as it goes upward.

According to this configuration, it can be configured such that when the upper frame 41 is set in the forward leaning posture (retracted position) while the front loader 12 mounted on the front portion of the work vehicle 1 is raised and when the front loader 12 is lowered as it is, a part of the front loader 12 moves along the upper curved portion 42a. Thereby, the front guard 30 can be swung from the forward leaning posture (retracted position) toward the standing posture (guard position) as the front loader 12 is lowered, so that the front guard 30 can be prevented from being damaged.

In addition, the elastic member 46 is provided on the back surface of the protruding portion 44.

According to this configuration, the hood 25 or the protruding portion 44 can be prevented from being damaged when the hood 25 hits the protruding portion 44. Further, the feeling when an operator holds the protruding portion 44 can be made good.

The work vehicle 1 includes the vehicle body 2, the hood 25 that can be opened and closed with the front portion of the vehicle body 2 as a fulcrum, and the front guard 30 that is attached to the vehicle body 2 in front of the hood 25. The front guard 30 has the lower frame 31 attached to the vehicle body 2, and the upper frame 41 that is attached to the lower frame 31 so as to be swingable around the shaft oriented in the vehicle width direction and the posture of which can be changed between a standing posture and a forward leaning posture by swinging with respect to the lower frame 31. The upper frame 41 has: the left part 42L that is pivotally supported by the left portion of the lower frame 31 and extends upward; the right part 42R that is pivotally supported by the right portion of the lower frame 31 and extends upward; and the upper part 43 that couples the upper portion of the left part 42L and the upper portion of the right part 42R. The upper part 43 is provided with the protruding portion 44 that protrudes downward. The protruding portion 44 is located in a position where it comes into contact with the upper surface of the hood 25 when the hood 25 is opened while the upper frame 41 is located in the standing posture.

According to this configuration, when the hood 25 is opened while the upper frame 41 of the front guard 30 is located in the standing posture (guard position), the hood 25 comes into contact with the protruding portion 44. Thereby, the front guard 30 can be swung from the standing posture (guard position) toward the forward leaning posture (retracted position) as the hood 25 is opened. Therefore, the front guard 30 can be prevented from being damaged.

In addition, when the hood 25 is opened while the front guard 30 is located in the standing posture, the hood 25 comes into contact with the protruding portion 44 and the upper frame 41 swings from the standing posture toward the forward leaning posture.

According to this configuration, when the hood 25 is opened while the upper frame 41 of the front guard 30 is set in the standing posture (guard position), the front guard 30 is swung from the standing posture (guard position) toward the forward leaning posture (retracted position) as the hood 25 is opened. Thereby, the front guard 30 can be prevented from being damaged.

In addition, the work vehicle 1 includes the vehicle body 2, the front guard 30 attached to the front portion of the vehicle body 2, and the front loader 12 that is attached to the front portion of the vehicle body 2 and can be raised or lowered. The front guard 30 has the lower frame 31 attached to the vehicle body 2, and the upper frame 41 that is attached to the lower frame 31 so as to be swingable around the shaft oriented in the vehicle width direction and the posture of which can be changed between a standing posture and a forward leaning posture by swinging with respect to the lower frame 31. The upper frame 41 has the vertical part 42 that extends upward, and the upper portion of the vertical part 42 is formed with the upper curved portion 42a that is curved backward as it goes upward. The upper curved portion 42a has the first upper region 42a1 that is located on the movement trajectory of a part of the front loader 12 when the front loader 12 is lowered while the upper frame 41 is located in the forward leaning posture, and the second upper region 42a2 that is curved forward as it goes downward from the first upper region 42a1.

According to this configuration, when the upper frame 41 is set in the forward leaning posture (retracted position) while the front loader 12 mounted on the front portion of the work vehicle 1 is raised and when the front loader 12 is lowered as it is, a part of the front loader 12 comes into contact with the first upper region 42a1 of the upper curved portion 42a, and then it moves along the second upper region 42a2. Thereby, the front guard 30 can be swung from the forward leaning posture (retracted position) toward the standing posture (guard position) as the front loader 12 is lowered, so that the front guard 30 can be prevented from being damaged.

In addition, the front loader 12 has the stand 80 that can be grounded when the front loader 12 is lowered. The first upper region 42a1 is located on the movement trajectory of a part of the stand 80 when the front loader 12 is lowered while the upper frame 41 is located in the forward leaning posture.

According to this configuration, when the front loader 12 is lowered, the stand 80 comes into contact with the first upper region 42a1 of the upper curved portion 42a, and then it moves along the second upper region 42a2. Thereby, the front guard 30 can be swung from the forward leaning posture (retracted position) toward the standing posture (guard position) as the front loader 12 is lowered, so that the front guard 30 can be prevented from being damaged.

In addition, the stand 80 has the left leg portion 81L, the right leg portion 81R, and the coupling portion 81M that couples the left leg portion 81L and the right leg portion 81R. The first upper region 42a1 is located on the movement trajectory of the coupling portion 81M when the front loader 12 is lowered while the upper frame 41 is located in the forward leaning posture.

According to this configuration, when the front loader 12 is lowered, the coupling portion 81M of the stand 80 comes into contact with the first upper region 42a1 of the upper curved portion 42a, and then it moves along the second upper region 42a2. Thereby, the front guard 30 can be swung from the forward leaning posture (retracted position) toward the standing posture (guard position) as the front loader 12 is lowered, so that the front guard 30 can be prevented from being damaged.

In addition, the upper frame 41 has the left part 42L that is pivotally supported by the left portion of the lower frame 31 and extends upward, and the right part 42R that is pivotally supported by the right portion of the lower frame 31 and extends upward. The vertical part 42 includes the left part 42L and the right part 42R, and the upper portion of the left part 42L and the upper portion of the right part 42R are each formed with the upper curved portion 42a.

According to this configuration, when the front loader 12 is lowered, a part of the front loader 12 can be brought into contact with the upper curved portions 42a formed at the upper portion of the left part 42L and at the upper portion of the right part 42R. Therefore, the part of the front loader 12 can be surely brought into contact with the upper curved portion 42a.

In addition, when the front loader 12 is lowered while the upper frame 41 is located in the forward leaning posture, a part of the front loader 12 moves downward from the first upper region 42a1 along the second upper region 42a2, and the upper frame 41 swings from the forward leaning posture toward the standing posture.

According to this configuration, when the upper frame 41 is set in the forward leaning posture (retracted position) while the front loader 12 is raised and when the front loader 12 is lowered as it is, a part of the front loader 12 moves downward from the first upper region 42a1 along the second upper region 42a2, and the upper frame 41 swings from the forward leaning posture toward the standing posture. Thereby, the front guard 30 can be prevented from being damaged.

In addition, the lower portion of the vertical part 42 is formed with the lower curved portion 42b that is curved backward as it goes downward. The lower curved portion 42b has the first lower region 42b1 that is located on the movement trajectory of a part of the front loader 12 when the front loader 12 is raised while the upper frame 41 is located in the forward leaning posture, and the second lower region 42b2 that is curved forward as it goes upward from the first lower region 42b1.

According to this configuration, when the upper frame 41 is set in the forward leaning posture (retracted position) while the front loader 12 is lowered and when the front loader 12 is raised as it is, a part of the front loader 12 is brought into contact with the first lower region 42b1, and then it can be moved along the second lower region 42b2. Thereby, the front guard 30 can be swung from the forward leaning posture (retracted position) toward the standing posture (guard position) as the front loader 12 is raised, so that the front guard 30 can be prevented from being damaged.

In addition, when the front loader 12 is raised while the upper frame 41 is located in the forward leaning posture, a part of the front loader 12 moves upward from the first lower region 42b1 along the second lower region 42b2, and the upper frame 41 swings from the forward leaning posture toward the standing posture.

According to this configuration, when the upper frame 41 is set in the forward leaning posture (retracted position) while the front loader 12 is lowered and when the front loader 12 is raised as it is, a part of the front loader 12 moves upward from the first lower region 42b1 along the second lower region 42b2, and the upper frame 41 swings from the forward leaning posture toward the standing posture. Thereby, the front guard 30 can be prevented from being damaged.

In addition, the protruding portion 44 is provided with the elastic member 46, and the elastic member 46 is located in a position where it comes into contact with the upper surface of the hood 25 when the hood 25 is opened while the upper frame 41 is located in the standing posture.

According to this configuration, when the hood 25 hits the protruding portion 44, it hits through the elastic member 46, so that the hood 25 or the protruding portion 44 can be prevented from being damaged.

One embodiment of the present invention has been described above, but the embodiments disclosed here should be considered illustrative in all respects and not restrictive. The scope of the present invention is indicated by the claims rather than the description given above, and it is intended that all modifications within the meaning and scope equivalent to the scope of claims are included.

The invention claimed is:

1. A front guard that is attached to a front portion of a vehicle body of a work vehicle, the front guard comprising:
a lower frame attached to the vehicle body; and
an upper frame that is attached to the lower frame so as to be swingable around a shaft oriented in a vehicle width direction and a posture of which can be changed between a standing posture and a forward leaning posture by swinging with respect to the lower frame, wherein:
the upper frame has a left part that is pivotally supported by a left portion of the lower frame and extends upward, a right part that is pivotally supported by a right portion of the lower frame and extends upward, and an upper part that couples an upper portion of the left part and an upper portion of the right part;
the upper part is provided with a protruding portion that protrudes downward; and
the protruding portion extends downward from a back edge of the upper part.

2. The front guard according to claim 1, wherein a lower portion of the left part and a lower portion of the right part are each formed with a lower curved portion that is curved backward as it goes downward.

3. The front guard according to claim 1, wherein the upper portion of the left part and the upper portion of the right part are each formed with an upper curved portion that is curved backward as it goes upward.

4. The front guard according to claim 1, wherein an elastic member is provided on a back surface of the protruding portion.

5. A work vehicle comprising:
a vehicle body;
a hood that can be opened and closed with a front portion of the vehicle body as a fulcrum; and
a front guard attached to the vehicle body in front of the hood, wherein:
the front guard has a lower frame attached to the vehicle body, and
an upper frame that is attached to the lower frame so as to be swingable around a shaft oriented in a vehicle width direction and a posture of which can be changed between a standing posture and a forward leaning posture by swinging with respect to the lower frame;
the upper frame has a left part that is pivotally supported by a left portion of the lower frame and extends upward, a right part that is pivotally supported by a right portion of the lower frame and extends upward, and an upper part that couples an upper portion of the left part and an upper portion of the right part;
the upper part is provided with a protruding portion that protrudes downward;
the protruding portion is located in a position where the protruding portion comes into contact with an upper surface of the hood when the hood is opened while the upper frame is located in the standing posture; and
when the hood is opened while the front guard is located in the standing posture, the hood comes into contact with the protruding portion and the upper frame swings from the standing posture toward the forward leaning posture.

6. A work vehicle comprising:
a vehicle body;
a front guard attached to a front portion of the vehicle body; and
a front loader that is attached to the front portion of the vehicle body and can be raised or lowered, wherein:
the front guard has a lower frame attached to the vehicle body, and
an upper frame that is attached to the lower frame so as to be swingable around a shaft oriented in a vehicle width direction and a posture of which can be changed between a standing posture and a forward leaning posture by swinging with respect to the lower frame;
the upper frame has a vertical part that extends upward;
an upper portion of the vertical part is formed with an upper curved portion that is curved backward as it goes upward;
the upper curved portion has a first upper region that is located on a movement trajectory of a part of the front loader when the front loader is lowered while the upper frame is located in the forward leaning posture, and a second upper region that is curved forward as it goes downward from the first upper region; and
when the front loader is lowered while the upper frame is located in the forward leaning posture, the part of the front loader moves downward from the first upper region along the second upper region, and the upper frame swings from the forward leaning posture toward the standing posture.

7. The work vehicle according to claim 6, wherein:
the front loader has a stand that can be grounded when the front loader is lowered; and
the first upper region is located on a movement trajectory of a part of the stand when the front loader is lowered while the upper frame is located in the forward leaning posture.

8. The work vehicle according to claim 7, wherein:
the stand has a left leg portion, a right leg portion, and a coupling portion that couples the left leg portion and the right leg portion; and
the first upper region is located on a movement trajectory of the coupling portion when the front loader is lowered while the upper frame is located in the forward leaning posture.

9. The work vehicle according to claim 6, wherein:
the upper frame has a left part that is pivotally supported by a left portion of the lower frame and extends upward, and a right part that is pivotally supported by a right portion of the lower frame and extends upward;
the vertical part includes the left part and the right part; and
an upper portion of the left part and an upper portion of the right part are each formed with the upper curved portion.

10. The work vehicle according to claim 6, wherein:
a lower portion of the vertical part is formed with a lower curved portion that is curved backward as it goes downward; and
the lower curved portion has a first lower region that is located on a movement trajectory of a part of the front loader when the front loader is raised while the upper frame is located in the forward leaning posture, and a second lower region that is curved forward as it goes upward from the first lower region.

11. The work vehicle according to claim 10, wherein when the front loader is raised while the upper frame is located in the forward leaning posture, the part of the front loader moves upward from the first lower region along the second lower region, and the upper frame swings from the forward leaning posture toward the standing posture.

12. The work vehicle according to claim 5, wherein:
the protruding portion is provided with an elastic member; and
the elastic member is located in a position where the elastic member comes into contact with an upper surface of the hood when the hood is opened while the upper frame is located in the standing posture.

\* \* \* \* \*